(12) United States Patent
Wolfgang et al.

(10) Patent No.: US 12,372,282 B2
(45) Date of Patent: Jul. 29, 2025

(54) APPARATUS AND SYSTEMS FOR SEPARATING PHASES IN LIQUID HYDROGEN PUMPS

(71) Applicant: General Electric Company, Schenectady, NY (US)

(72) Inventors: Ernst Stautner Wolfgang, Niskayuna, NY (US); Constantinos Minas, Slingerlands, NY (US)

(73) Assignee: General Electric Company, Evendale, OH (US)

( * ) Notice: Subject to any disclaimer, the term of this patent is extended or adjusted under 35 U.S.C. 154(b) by 311 days.

(21) Appl. No.: 17/900,499

(22) Filed: Aug. 31, 2022

(65) Prior Publication Data

US 2024/0068720 A1  Feb. 29, 2024

(51) Int. Cl.
*F25B 41/40* (2021.01)
*B01D 19/00* (2006.01)
(Continued)

(52) U.S. Cl.
CPC .......... *F25B 41/40* (2021.01); *B01D 19/0031* (2013.01); *B01D 19/0063* (2013.01); *B01D 39/2027* (2013.01); *F17C 1/00* (2013.01); *F17C 2205/0338* (2013.01); *F17C 2205/0355* (2013.01); *F17C 2205/037* (2013.01);
(Continued)

(58) Field of Classification Search
CPC ........ F17C 2265/017; F17C 2227/0135; F17C 2265/01–2265/015; F17C 2265/012; F17C 2205/0344; F17C 1/00; F17C 2205/0338; F17C 2205/0355; F17C 2205/037; F17C 2221/012; F17C 2223/0161; F17C 2250/0434; F17C 2250/0626; F17C 2205/0434; B01D 19/0031; B01D 19/0063; B01D 39/2027; F25B 41/40
See application file for complete search history.

(56) References Cited

U.S. PATENT DOCUMENTS

| | | | |
|---|---|---|---|
| 4,447,195 A | 5/1984 | Schuck | |
| 5,513,961 A * | 5/1996 | Engdahl | F17C 9/00 417/313 |

(Continued)

FOREIGN PATENT DOCUMENTS

| | | | |
|---|---|---|---|
| CN | 209841506 U | * | 12/2019 |
| KR | 102376273 B1 | | 3/2022 |

OTHER PUBLICATIONS

English language translation of Yang. Translated Nov. 2024 (Year: 2019).*

*Primary Examiner* — Cassey D Bauer
(74) *Attorney, Agent, or Firm* — Hanley, Flight & Zimmerman, LLC

(57) ABSTRACT

Methods, apparatus, systems, and articles of manufacture are disclosed herein that include a cryogenic pump system comprising: a cryogenic liquid tank; a cryogenic pump including a suction adapter, the suction adapter connected to the cryogenic liquid tank via a liquid supply line and a gaseous return line; and a phase separator connected downstream of the cryogenic liquid tank and upstream of the cryogenic pump, the phase separator including a filtration structure integrated into the liquid supply line to separate vapor from cryogenic liquid, the phase separator connected to the gaseous return line to direct the vapor to the cryogenic liquid tank.

16 Claims, 10 Drawing Sheets

(51) Int. Cl.
*B01D 39/20* (2006.01)
*F17C 1/00* (2006.01)

(52) U.S. Cl.
CPC .............................. *F17C 2221/012* (2013.01); *F17C 2223/0161* (2013.01); *F17C 2227/0135* (2013.01); *F17C 2250/0434* (2013.01); *F17C 2250/0626* (2013.01); *F17C 2265/017* (2013.01)

(56) References Cited

U.S. PATENT DOCUMENTS

| | | |
|---|---|---|
| 5,881,549 A | 3/1999 | Janes |
| 6,550,717 B2 | 4/2003 | MacCready et al. |
| 7,870,717 B2 | 1/2011 | MacKnight |
| 9,464,573 B2 | 10/2016 | Remy et al. |
| 9,676,491 B2 | 6/2017 | Epstein et al. |
| 9,932,124 B2 | 4/2018 | Kamath et al. |
| 2004/0129836 A1 | 7/2004 | Seidel |
| 2013/0306797 A1 | 11/2013 | Dalle Donne et al. |
| 2019/0301945 A1* | 10/2019 | Wang .................... G01J 5/0088 |
| 2019/0316813 A1* | 10/2019 | Longsworth ............. F25B 9/14 |
| 2020/0096157 A1 | 3/2020 | Kim et al. |

* cited by examiner

APPARATUS AND SYSTEMS FOR SEPARATING PHASES IN LIQUID HYDROGEN PUMPS

FEDERALLY SPONSORED RESEARCH

This invention was made with Government support under contract number 80NSSC19M0125 awarded by the National Aeronautics and Space Administration. The Government has certain rights in this invention.

FIELD OF THE DISCLOSURE

This disclosure relates generally to pumping liquid hydrogen, and, more particularly, to apparatus and systems for separating phases in liquid hydrogen pumps.

BACKGROUND

In recent years, hydrogen-powered vehicles (e.g., automotives, aircraft, buses, ships, etc.) have become more prevalent. As such, advancements in liquid hydrogen (LH2) pumps have been developed. LH2 pumps are included on hydrogen vehicles to supply liquid hydrogen fuel to onboard high-pressure receiver tanks or hydrogen engine systems. LH2 pumps can be centrifugal pumps or positive displacement piston pumps depending on a desired compression ratio for a given application. Furthermore, LH2 pumps can include a single cylinder piston or multi-cylinder pistons depending on a desired mass flow rate for the given application.

BRIEF DESCRIPTION OF THE DRAWINGS

A full and enabling disclosure of the preferred embodiments, including the best mode thereof, directed to one of ordinary skill in the art, is set forth in the specification, which refers to the appended Figures, in which.

Figure 1:
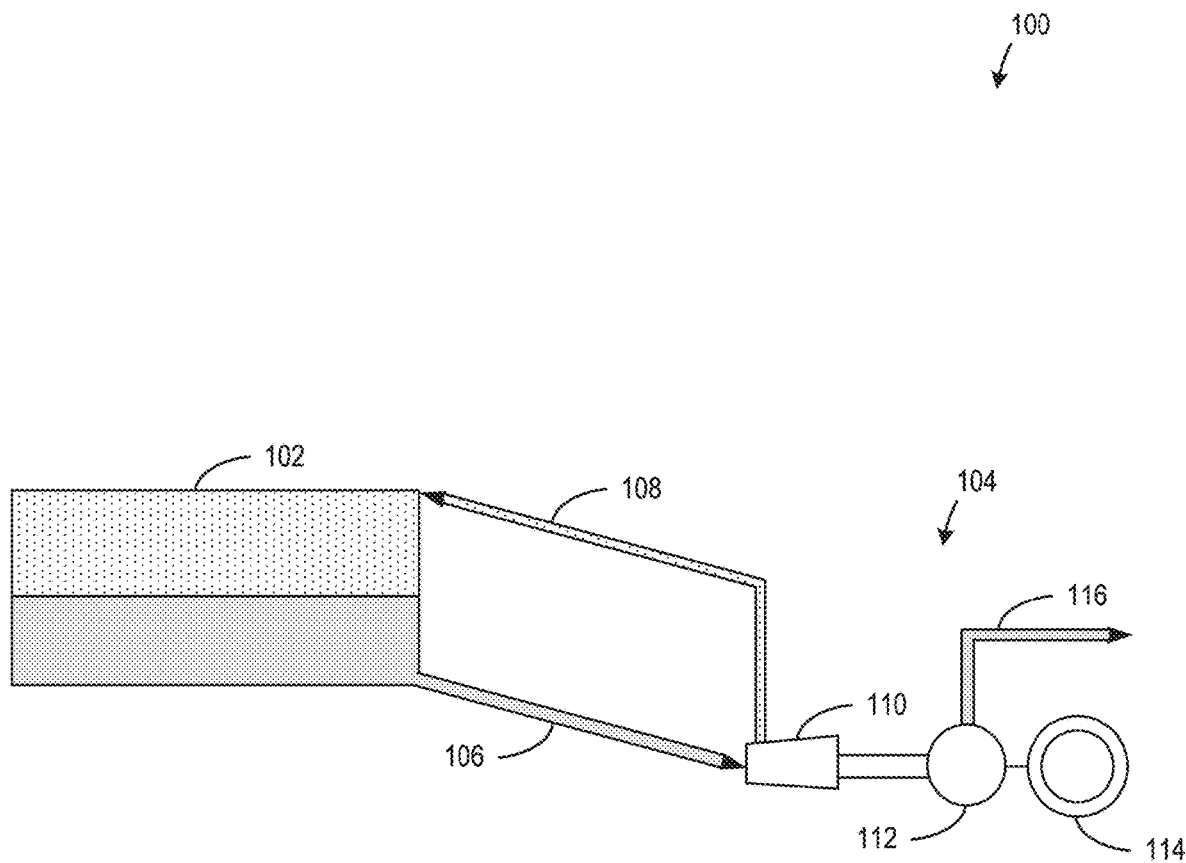
FIG. 1 illustrates a liquid hydrogen (LH2) pump system connected to an LH2 tank.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

In some examples used herein, "upstream" and "downstream" refer to the relative direction with respect to fluid flow in a fluid pathway. The term "upstream" refers to the direction from which the fluid flows, and "downstream" refers to the direction to which the fluid flows. For example, when a system includes a pump and a phase separator, and the fluid flows through the phase separator prior to entering the pump, then the phase separator is said to be upstream of the pump, and the pump is said to be downstream of the phase separator.

Cryogenic pumping systems (e.g., liquid hydrogen (LH2) pumping systems, liquid nitrogen (LN2) pumping systems, etc.) are included in vehicles (e.g., aircraft, cars, trucks, ships, etc.), such as hydrogen powered vehicles, to transfer cryogenic fuel to component(s) (e.g., high-pressure receiver tanks) and/or other system(s) (e.g., hydrogen fuel cells, fuel management system(s), hydrogen engines, etc.). Such cryogenic pumping systems are described with reference to LH2 pumping systems, but it should be appreciated that such cryogenic pumping systems can apply to other types of cryogenic liquid such as LN2, liquid helium, etc. Such LH2 pumping systems include an onboard LH2 tank, a first flowline to transmit LH2 from the LH2 tank to the LH2 pump, and a second flowline to transmit hydrogen vapor from the LH2 pump back to the onboard LH2 tank. The LH2 pump includes a suction adapter, a motor, a belt-driven crank drive, and a cold end compression chamber (e.g., cylinder) with a reciprocating piston. The suction adapter enables the LH2 to flow into the compression chamber when the piston moves from a top-dead center (TDC) position to a bottom-dead center (BDC) position. The motor and the crank drive move the piston back to the TDC position to compress the LH2. The compressed LH2 (e.g., cryo-compressed hydrogen) is fed through a pump discharge flowline that leads to the component(s) and/or other system(s) of the hydrogen powered vehicle. The suction adapter can also remove some hydrogen vapor present in the first flowline and send the vapor back to the LH2 tank via the second flowline. However, in many cases, the suction adapter alone is not able to remove a sufficient quantity of hydrogen vapor from the LH2.

Hydrogen vapor bubbles, or "cavities", can form in the onboard LH2 tank for many reasons. For example, during a refueling process of the onboard LH2 tank or any cryogenic hydrogen tank, turbulence, currents, or high flowrates can cause hydrogen vapor bubbles form in the LH2. Standard cryogenic practices stipulate that the cryogenic tank should rest for a duration (e.g., 24 hours) after the tank is refueled to allow the LH2 to settle and the vapor bubbles to dissipate. However, for hydrogen powered aircraft, there is a limited time (e.g., 30 minutes) that the aircraft is permitted to idle at an airport gate. When the hydrogen powered aircraft is refueled with LH2, there will inevitably be hydrogen vapor bubbles present within the onboard LH2 tank prior to takeoff.

In another example, during flight, the hydrogen powered aircraft can ascend or descend at non-zero angles (e.g., +/−10 degrees) relative to cruising angle (e.g., zero degrees). Additionally, the hydrogen powered aircraft can experience turbulent conditions that can cause unexpected and unstable movement of the aircraft. As the aircraft ascends, descends, and/or experiences turbulence, the LH2 fuel can migrate (e.g., slosh) in the onboard LH2 tank and new hydrogen vapor bubbles can form.

In yet another example, during storage of the LH2 in the onboard LH2 tank, the hydrogen molecules undergo exothermic reactions causing temperatures to steadily increase. This temperature increase can cause the LH2 to boil, hence the term "boil-off," which is used herein to describe the warming and evaporation process of contained LH2. In other words, despite an insulation quality of the onboard LH2 tank, the temperature of the LH2 can rise, and the LH2 can boil-off. Hydrogen vapor bubbles formed from boil-off can enter the first flowline with the LH2 and flow downstream to the LH2 pump.

As used herein, the "vapor pressure" refers to pressure acting on the interior walls of a tank (e.g., an onboard LH2 tank) and the surface of a liquid (e.g., LH2) within the tank. When an example LH2 tank is refueled, the LH2 includes a first portion of the internal volume of the LH2 tank (e.g., 90%), and hydrogen vapor comprises a second portion of the internal volume of the LH2 tank (e.g., 10%). As used herein, "saturated pressure" refers to the vapor pressure when the LH2 and the hydrogen vapor are in equilibrium. That is, when the evaporation rate of the LH2 is equal to the condensation rate of the hydrogen vapor, the vapor pressure is at a saturated pressure. The saturated pressure is dependent on the temperature within the tank. Thus, when the temperature of the LH2 remains substantially constant, and when the LH2 settles after a given period (e.g., one hour, two hours, 12 hours, etc.), the LH2 and the hydrogen vapor are considered to be in equilibrium, and the vapor pressure is substantially similar to the saturated pressure.

As used herein, the "suction head" refers the to the difference between the vapor pressure and the actual (static) pressure of the LH2. During the pumping process of the LH2, a net positive suction head (NPSH) is achieved when the vapor pressure is greater than the static pressure of the LH2. Furthermore, to maintain the NPSH, the vapor pressure is regulated to a value greater than the saturated pressure at the given temperature of the LH2. In some cases, the quantity of hydrogen vapor can be increased in the LH2 tank (e.g., via a thermosiphon loop, a submerged heater, a vapor return line from the suction adaptor of the LH2 pump, etc.) to increase the vapor pressure above the saturated pressure and maintain the NPSH. The NPSH is utilized during the pumping process to cause the LH2 to flow from the upstream end (e.g., the onboard LH2 tank) to the downstream end (e.g., the LH2 pump and the discharge line). In other words, a sufficiently high NPSH (e.g., 10 pounds per square inch (psi)) is created in the system to cause the LH2 to flow into the LH2 pump and allow the LH2 pump to operate properly. When the static pressure falls below the vapor pressure (e.g., when the NPSH is formed), cavitation can occur, and hydrogen vapor bubbles can form in the LH2. As used herein, "cavitation" refers to the formation of bubbles (e.g., "cavities") in a liquid (e.g., LH2) due to movement (e.g., surface vibrations, sloshing, pouring, flowing, etc.), boil-off, and/or the NPSH.

Since cavitation can occur in the onboard LH2 tank, the first flowline transfers both LH2 and hydrogen vapor-filled cavities from the onboard LH2 tank to the suction adapter. The suction adapter of the LH2 pump includes a conical metal grid filter that can rupture some of the bubbles and release hydrogen vapor into the second flowline to be returned to the onboard LH2 tank. However, due to the mass flow of the LH2 and the size of the filter, the suction adapter cannot eliminate all of the cavities, and some bubbles can enter into the cold end compression chamber along with the LH2.

When hydrogen vapor-filled cavities are present in the compression chamber, the piston compresses the bubbles, which causes the bubbles to collapse and generate shock waves that can damage the compression chamber, the piston, the suction adapter, the pump discharge flowline, etc. The damage caused by the collapse of the vapor cavities is referred to herein as "cavitation damage." The shock waves formed are generally strong near the point of collapse and weaken as they propagate outward. The bubbles near the walls of the compression chamber, the piston, and/or the suction adapter can cause the most catastrophic cavitation damage. Cavitation damage can cause high stresses, pitting, and/or erosion of wetted parts and can significantly damage the LH2 pump to the point where parts included therein may be replaced sooner than anticipated. Since components of LH2 pumps are associated with high costs (e.g., tens of thousands of United States dollars), frequent repair and replacement of damaged parts or systems is inefficient, expensive, and desirable to avoid. Furthermore, cavitation can cause a significant reduction in mass flowrate of LH2 through the LH2 pump. In some cases, cavitation can be detected by a sudden increase in a discharge temperature of the compressed mixture, a sudden drop in mass flow rate, a sudden drop in pump motor oscillations, and/or a sudden decrease in vibrations of the LH2 pump.

In examples disclosed herein, phase separating LH2 pump systems can be used to remove hydrogen vapor cavities from LH2 before the LH2 reaches the suction adapter of the LH2 pump. Example phase separation systems disclosed herein include a phase separator integrated directly into the first and second flowlines mentioned above. The example phase separator is a vacuum jacketed apparatus with a sintered metal portion through which the LH2 flows. The sintered metal portion can be a porous structure additively manufactured using metal alloys compatible with LH2 at cryogenic temperatures (e.g., metal alloys tested at 297 Kelvin (K)). In other words, the sintered metal portion of the phase separator can withstand cryogenic temperatures without becoming embrittled. When LH2 flows through the phase separator, the porous channels cause the LH2 and the hydrogen vapor to separate while also reducing the temperature and saturated pressure of the LH2. As the saturated temperature decreases, the density of the LH2 increases, and the density of the hydrogen vapor decreases. Due to a phenomenon referred to herein as "buoyancy-driven flow," density reduction of the hydrogen vapor causes the GH2 to rise out of the phase separator, into the second flowline (the hydrogen vapor return flowline), and back into the onboard LH2 tank. The density increase of the LH2 causes the LH2 to continue flowing through the sintered metal portion, into the first flowline (the LH2 flowline), and, eventually, into the LH2 pump.

Downstream of the phase separator, the first flowline includes LH2 and a substantially small amount of hydrogen vapor bubbles. In examples disclosed herein, a "substantially small" amount of hydrogen vapor bubbles corresponds to a range of quantities from zero bubbles to a quantity of bubbles (e.g., 2%, 5%, 10%, etc. of vapor per unit volume of LH2) that the suction adapter is capable of removing (e.g., via the metal grid filter) and transmitting back to the LH2 tank. In examples disclosed herein, phase separation systems for removing hydrogen gas bubbles from LH2 prior to the LH2 entering the LH2 pump results in less cavitation damage to the LH2 pump and a longer lifespan of the LH2 pump and/or components included therein, relative to current LH2 pump systems.

Example phase separating LH2 pump systems disclosed herein improve the ability to separate hydrogen vapor from the LH2/GH2 mixture extracted from the onboard LH2 tank. Thus, more hydrogen vapor can be separated from the LH2 extraction flowline and returned to the onboard LH2 tank via the vapor return flowline to increase the vapor pressure in the onboard LH2 tank. Therefore, example phase separating LH2 pump systems disclosed herein improve the ability/efficiency of LH2 pumps to extract LH2 from the onboard LH2 tanks because of the increased vapor pressure (in the onboard LH2 tanks) which maintains an increased NPSH in the system. Furthermore, increasing the vapor pressure in the onboard LH2 tank also increases the boiling point (e.g., temperature at which boil-off occurs) of the LH2. Thus, example phase separating LH2 pump systems disclosed herein reduce the amount of boil-off in the onboard LH2 tank, which reduces mass loss of LH2 fuel due to evaporation and reduces cavitation in the LH2. In some examples, the vapor return flowline can completely or partially divert the hydrogen vapor to other systems (e.g., hydrogen fuel cells, hydrogen engine fuel injectors, etc.) onboard the vehicle either at the given vapor pressure or after increasing the vapor pressure (e.g., via a compressor). For example, vapor return flowlines can direct at least a portion of the separated hydrogen vapor to a compressor, which can pressurize the vapor prior to combustion in gas turbine engine(s) (e.g., hydrogen powered engine(s)). In another example, the vapor return flowlines can direct at least a portion of the separated hydrogen vapor to a hydrogen fuel cell to convert chemical energy to electrical energy and power other onboard systems (e.g., auxiliary power, cabin air conditioning, etc.). Thus, example phase separating LH2 pump systems disclosed herein increase the amount of hydrogen fuel (e.g., GH2) available to other systems onboard the vehicle (e.g., aircraft).

For the figures disclosed herein, identical numerals indicate the same elements throughout the figures. The example illustration of FIG. 1 is a schematic representing an LH2 pumping system 100. As shown in the example of FIG. 1, the LH2 pumping system 100 ("system 100") includes an onboard LH2 tank 102 connected to an LH2 pump 104 via an LH2 flowline 106 and a GH2 flowline 108. The example onboard LH2 tank 102 includes LH2 and hydrogen vapor (gaseous hydrogen (GH2)). The example LH2 pump 104 includes a suction adapter 110, a pump cold end 112, a motor 114, and a discharge flowline 116. In general, the system 100 is integrated into a hydrogen vehicle to pump LH2 to components (e.g., high-pressure receiver tanks, heat exchangers, compressors, buffer tanks, etc.) and/or other systems (e.g., fuel management systems, cooling systems, hydrogen engines, etc.). In some cases, the system 100 cryogenically compresses the LH2 into a supercritical state referred to as cryo-compressed hydrogen (CcH2) for combustion in some types of hydrogen engines.

The example system 100 illustrated in FIG. 1 includes the onboard LH2 tank 102 to provide LH2 fuel to the LH2 pump 104 via the LH2 flowline 106 and to receive hydrogen vapor from the LH2 pump 104 via the GH2 flowline 108. The example onboard LH2 tank 102 includes insulating materials and/or insulating structures (e.g., a vacuum layer between an inner shell and an outer shell) to maintain cryogenic temperatures of the LH2 and limit excessive boil-off. As referred to herein, "boil-off" refers to evaporation of LH2 due to thermal increases. During storage, the LH2 temperature may slightly increase (e.g., by one or two K), and some LH2 may boil-off. In some examples, the LH2 supply tank 102 includes venting and/or pressure relief mechanisms to release hydrogen vapor into atmosphere and reduce excessive pressure build up.

The example onboard LH2 tank 102 is not exclusively full of LH2, but rather includes two different states of hydrogen (e.g., LH2 and GH2) with an associated saturated pressure. The saturated pressure in the onboard LH2 tank 102 is dependent on the temperature of the LH2 and GH2. Thus, when internal temperatures gradually increase, the saturated pressure of the onboard LH2 tank 102 proportionally increases. Similarly, as boil-off occurs and/or when hydrogen vapor returns to the onboard LH2 tank 102 via the GH2 flowline 108, the vapor pressure in the onboard LH2 tank 102 increases. In some examples, the onboard LH2 tank 102 includes one or more pressure sensors to monitor the vapor pressure and transmit vapor pressure values to an example control system described in further detail below. In some examples, the vapor pressure is allowed to reach a value that satisfies a safety threshold while also providing a NPSH to the system 100. As illustrated in FIG. 1, the example onboard LH2 tank 102 is in an elevated position above the example LH2 pump 104. The example onboard LH2 tank 102 is above the LH2 pump 104 to provide a portion of the NPSH as a result of static pressures of the LH2 and/or gravity acting on the LH2.

The example system 100 illustrated in FIG. 1 includes the first and second flowlines 106, 108 to connect, couple, and/or otherwise transmit fluid between the onboard LH2 tank 102 and the LH2 pump 104. More specifically, the LH2 flowline 106 is included in the system 100 to transfer LH2 to the LH2 pump 104, and the GH2 flowline 108 is included in the system 100 to transfer hydrogen vapor (GH2) to the onboard LH2 tank 102. The example system 100 Includes the discharge flowline 116 to transmit compressed LH2 and/or CcH2 from the LH2 pump and/or the pump cold end 112 to other components and/or systems in the example hydrogen vehicle.

In some examples, the LH2 flowline 106, the GH2 flowline 108, the discharge flowline 116, and/or other flowlines illustrated in the figures disclosed herein are vacuum jacketed (VJ) flowlines that are rigid, flexible, or a combination thereof. The example VJ flowlines (e.g., the first, second, and/or discharge flowlines 106, 108, and/or 116) are designed with an inner line, an outer line, and an intermediary layer. The example intermediary layer can include multiple alternating layers of a heat barrier and a non-conductive spacer to form gap between the inner line and the outer line. The example intermediary layer can be depressurized using a vacuum pump to create a static vacuum shield. The example vacuum shield can safeguard the cryogenic fuel from heat transfer caused by radiation, conduction, and/or convection. Thus, the LH2 flowline 106, the second flowline 108, the discharge flowline 116, and/or the other flowlines transport LH2 and/or GH2 throughout the example system 100 and/or other systems disclosed herein while maintaining cryogenic temperatures and, in some examples, preventing or inhibiting boil-off. In some examples, the LH2 flowline 106, the second flowline 108, the discharge flowline 116 include VJ valves, vapor vents, vapor vent heaters, VJ manifolds, etc., to further control the temperatures of the LH2 fuel.

The example system 100 illustrated in FIG. 1 includes the suction adapter 110 to provide a connection between the first and second flowlines 106, 108 and the pump cold end 112. As mentioned previously, the example suction adapter 110 can include a conical metal grid filter to depressurize and/or separate some hydrogen vapor bubbles from the LH2. In some examples, the suction adapter 110 includes an inlet, a first outlet, and a second outlet. The first outlet in this example leads from the suction adapter 110 to the pump cold end 112. In some examples, the suction adapter 110 is connected to the pump cold end 112 via a bolted flange connection with a Teflon® gasket. In some examples, the LH2 flowline 106 is fixed (e.g., welded, connected via airtight connections, etc.) to the suction adapter 110 at the inlet, and the GH2 flowline 108 is fixed (e.g., welded, connected via airtight connections, etc.) to the suction adapter 110 at the second outlet. The connection points ensure that no LH2 of hydrogen vapor can escape the system 100 and depressurize the example LH2 pump 104. As illustrated in FIG. 1, the second outlet of the example suction adapter 110 is substantially perpendicular to the inlet of the suction adapter 110. However, in some examples, the second outlet can be skewed and/or non-perpendicular to the inlet of the suction adapter 110.

The example system 100 illustrated in FIG. 1 includes the pump cold end 112 to compress the LH2 at cryogenic temperatures (e.g., 18-33 Kelvin (K)). The example pump cold end 112 includes a cylinder connected to the suction adapter and a piston to stroke from the bottom-dead center (BDC) position to the top-dead center (TDC) position. When the LH2 pump 104 and the pump cold end 112 are cooled to an operational temperature (e.g., 110 K, 115 K, etc.), the piston can be moved from the BDC position to the TDC position to compress the LH2 and drive the compressed mixture through the discharge flowline 116. The example motor 114 illustrated in FIG. 1 is included in the example system 100 to stroke the piston between the BDC and the TDC positions via at least a belt drive and a crank shaft. In some examples, one pump cold end 112 is included in the LH2 pump 104 to pump LH2 at a first flowrate. In some examples, multiple (e.g., three) pump cold ends 112 are included in the LH2 pump to pump LH2 at a second flowrate greater than the first flowrate. Additionally or alternatively, an operational speed of the example motor 114 can be increased to stroke the piston of the pump cold end 112 at a higher rate and, thus, cause the LH2 flowrate to increase.

Figure 2:
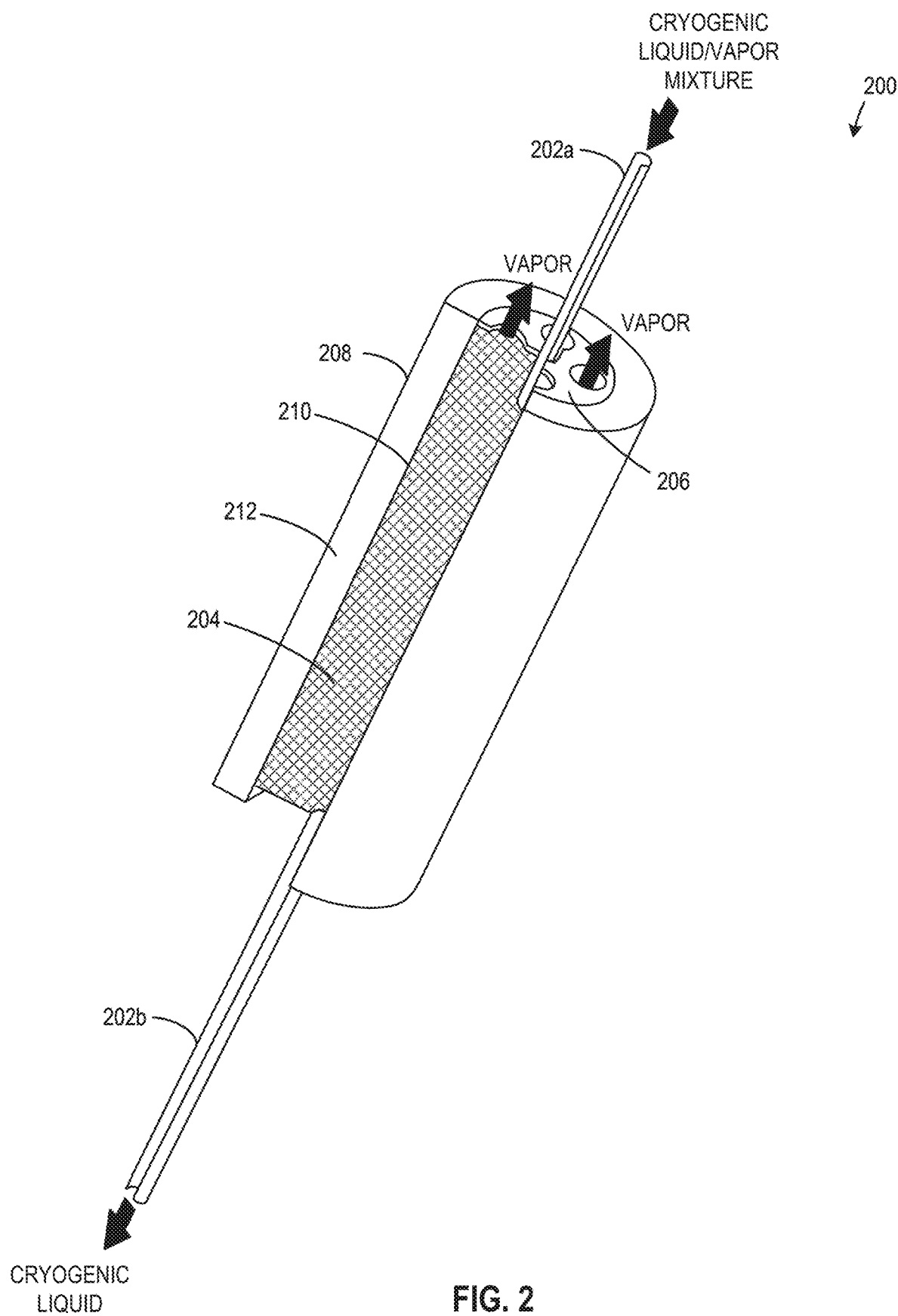
FIG. 2 illustrates a phase separator to separate vapor from cryogenic liquid.

FIG. 2 is an illustration of a phase separator 200 to separate vapor from cryogenic liquid. The phase separator illustrated in FIG. 2 includes an upstream flowline 202a, a downstream flowline 202b, a separation material 204, a grated endcap 206, an outer shell 208, an inner shell 210, and an insulation material 212. A mixture of cryogenic liquid (e.g., LH2, LN2, etc.) and vapor (e.g., gaseous hydrogen vapor (GH2), gaseous nitrogen vapor (GN2), etc.) enters in the upstream flowline 202a and flows through the separation material 204. The separation material 204 can be coarse steel wool, loosely packed within the inner shell 210. The separation material 204 includes a plurality of small channels through which an LH2 and GH2 mixture can travel. Since the LH2 and GH2 mixture is directed from a single channel (upstream flowline 202a) to multiple channels, the flowrate, pressure, and temperature of the LH2 and/or the GH2 decreases. As the pressures of the LH2 and the GH2 decrease, the density of the LH2 increases and the density of the GH2 decreases. When the density of the GH2 decreases to a sufficient value, the GH2 rises up out of the separation material 204 and through the grated endcap 206.

The outer shell 208 and the inner shell 210 can be fabricated from stainless steel sheet metal pressed and/or stamped into cylindrical shapes as illustrated in FIG. 2. In some examples, the inner shell 210 and the outer shell 208 are welded or otherwise attached to the grated endcap 206 and/or other endcap(s) at an end of the phase separator 200 opposite the grated endcap 206. The insulation material 212 is included between the inner shell 210 and the outer shell 208 to inhibit heat transfer between the LH2 in the phase separator 200 and the surrounding environment. The insulation material 212 can include foam, fiberglass, plastics, and/or another type of material that reduces the rate of heat transfer across the outer shell 208 and the inner shell 210.

Although the phase separator 200 can separate some GH2 present in an LH2/GH2 mixture, some limitations are imposed by the current design. For example, the separation material 204 is constructed of steel wool that includes multiple small channels through which the LH2 can travel, thus reducing the saturation pressure of the LH2 and reducing the density of the hydrogen vapor to some degree. However, the separation material 204 is loosely packed in the phase separator 200 such that the structure/design/topology/consistency of the channels is random and not optimized. Furthermore, the insulation material 212 occupies the volume between the outer and inner shells 208, 210 to reduce heat transfer but cannot provide the same heat transfer protection as a vacuum-insulating layer. If examples of insulation materials 212 given above were introduced to a vacuum pressure environment, the insulation materials 212 would likely damage and/or collapse due to insufficient internal structuring thereby lose some insulative properties. Furthermore, the outer and inner shells 208, 210 are made of sheet metal and lack any intermediate structures (e.g., trusses, suspensions, beams, rods, etc.) or additional materials (e.g., composites) that may enable the outer and inner shells 208, 210 to withstand pressure differentials between a possible vacuum insulation layer and the internal pressure or a vacuum insulation layer and the atmosphere. Since no vacuum layer is present, the phase separator 200 cannot be integrated into vacuum-jacketed flowlines of an LH2 pumping system without introducing significant heat transfer to the system. Lastly, based on the configuration, the phase separator 200 vents the separated GH2 into atmosphere instead of capturing the vapor with a vapor return flowline. Thus, the phase separator 200 wastes separated hydrogen vapor rather than utilizing the hydrogen vapor to increase the vapor pressure in an LH2 supply tank (e.g., onboard LH2 tank), maintain the NPSH in the pump system, fuel other onboard systems (e.g., hydrogen fuel cells, hydrogen powered engines, etc.).

Figure 3:
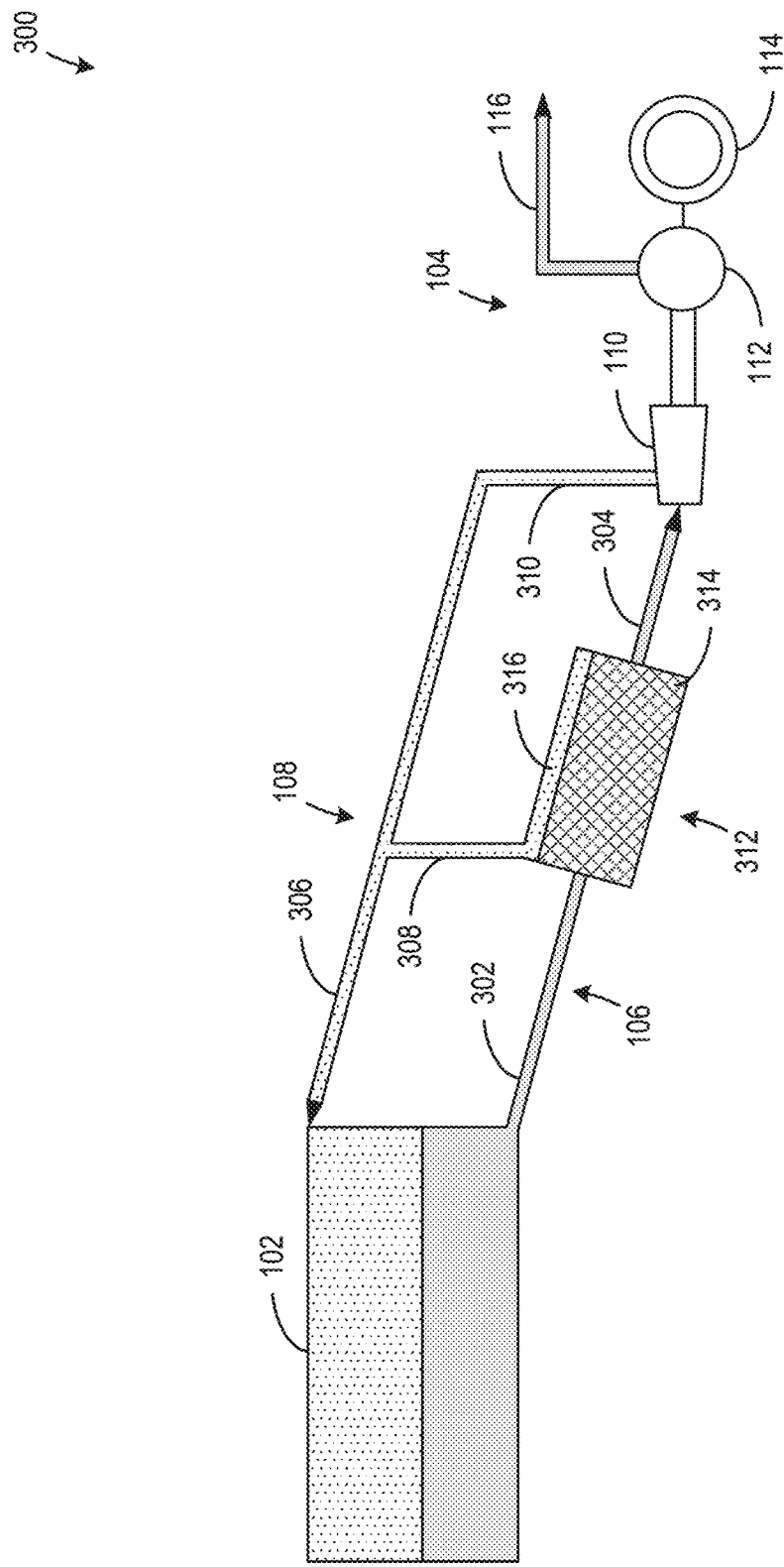
FIG. 3 illustrates an example first phase separating LH2 pump system for separating hydrogen vapor from LH2 in LH2 pumps.

FIG. 3 is an illustration of an example first phase separating LH2 pump system 300 in accordance with the teachings disclosed herein. The example first phase separating LH2 pump system 300 ("system 300") is used for separating hydrogen vapor from LH2 before the LH2 enters the compression chamber portion (e.g., the pump cold end 112) of the example LH2 pump 104. The first example phase separation system 300 includes the onboard LH2 tank 102, the LH2 pump 104, the LH2 flowline 106 including a first LH2 portion 302 and a second LH2 portion 304, the GH2 flowline 108 including a first GH2 portion 306, a second GH2 portion 308, and a third GH2 portion 310, the suction adapter 110, the pump cold end 112, the motor 114, and the discharge flowline 116. The example system 300 also includes a phase separator 312, a filtration structure 314, and a vapor accumulator 316.

The example system 300 illustrated in FIG. 3 includes the phase separator 312 to extract the GH2 from the LH2 flowline 106. The example phase separator 312 is described in greater detail below with reference to FIG. 5 and includes a vacuum insulation layer similar to that described for the first and second flowlines 106, 108 above. The example phase separator 312 is said to be integrated into the LH2 flowline 106 and the GH2 flowline 108. That is, the first LH2 portion 302, the second LH2 portion 304, the second GH2 portion 308, and the phase separator 312 are coupled together via bayonet connections such that respective vacuum insulation layers are proximal to each other. In some examples, the vacuum insulation layers of the first LH2 portion 302, the second LH2 portion 304, and the second GH2 portion 308 are in contact with the vacuum insulation layer of the phase separator 312. Thus, the first LH2 portion 302, the second LH2 portion 304, and the second GH2 portion 308 may be connected to the phase separator 312 before the vacuum insulation layers of the flowlines 106-108 and the phase separator 312 are depressurized substantially simultaneously.

The example system 300 illustrated in FIG. 3 includes the example filtration structure 314 to reduce the saturated pressure of the LH2 and GH2 that enter the phase separator 312 from the first LH2 portion 302 of the LH2 flowline 106. In some examples, the filtration structure 314 is a sintered metal structure, which can be a porous metallic structure formed by pressing/shaping powdered metal into a portion and/or layer of the structure and applying heat to fuse the powdered metal together and permanently hold the portion/layer of the structure. Many portions and/or layers can be formed in succession to ultimately fabricate the filtration structure 314. The example filtration structure 314 can be additively manufactured using automated manufacturing methods such as direct metal laser sintering (DMLS).

In some examples, the filtration structure 314 is composed of one or more metals with a sufficient tolerance against hydrogen embrittlement. Hydrogen embrittlement is a process that decreases the fracture toughness or ductility of a metal due to the presence of atomic and/or gaseous hydrogen. To test the tolerance of metal against hydrogen embrittlement, metal degradation due to hydrogen environmental embrittlement (HEE) is measured. The HEE occurs when controlled stresses are applied to the metal while being exposed to a gaseous hydrogen environment at cryogenic temperatures (e.g., 297 K) and high pressures (e.g., 100 psi). A standardized HEE index is determined for the metal based on the level of degradation experienced as a result of the HEE testing. Metallic material(s) (e.g., pure metal, metal alloy, etc.) chosen for the filtration structure 314 are chosen based on the HEE index and embrittlement testing at room temperature. In other words, the materials of the filtration structure 314 do not show embrittlement at cryogenic temperatures or at room temperatures. Some example metals with a sufficient HEE index for use in the filtration structure 314 include but are not limited to austenitic steels (e.g., A286, 216, 316, 22-13-5 (Nitronic 50), etc.), aluminum alloys (e.g., 1100-TO, 2011, 2024, 5086, 6061-T6, 6063, 7039, 7075-T73, etc.), copper alloys (e.g., copper, aluminum bronze, GRCop-84 (Cu-3Ag-0.5Zr), NARloy-Z, 70-30 brass, etc.), and/or pure titanium.

Due to the porous material that composes the filtration structure 314, the flowrate of the two-phase (LH2 and GH2) mixture reduces and branches into multiple flow pathways in the filtration structure 314. The flowrate reduction and flow splitting results in a decrease of temperature and saturated pressure in the two-phase mixture. When the temperature and saturated pressure of the two-phase mixture decreases, the density of the LH2 phase decreases and the density of the GH2 phase increases (shown in FIGS. 6-9). As the density of the GH2 decreases, the hydrogen vapor molecules rise out of the filtration structure 314 and into the vapor accumulator 316 of the phase separator 312. The example vapor accumulator 316 occupies a portion of the internal volume of the phase separator 312 and is included to collect the hydrogen vapor that rises out of the filtration structure 314 and direct the GH2 into the second GH2 portion 308.

Figure 4:
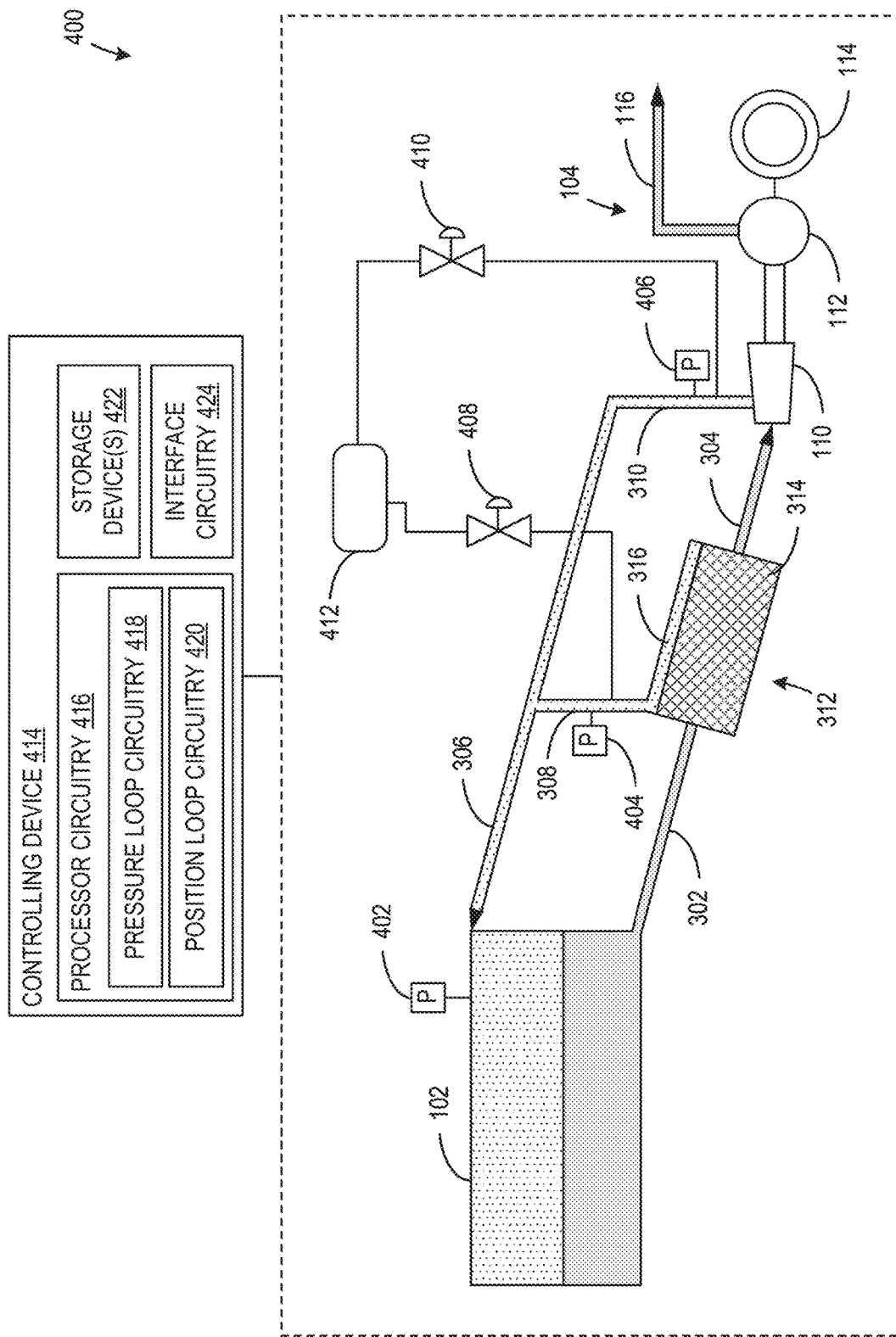
FIG. 4 illustrates an example second phase separating LH2 pump system for separating hydrogen vapor from LH2 in LH2 pumps.

FIG. 4 is an illustration of an example second phase separating LH2 pump system 400 in accordance with the teachings disclosed herein. The example second phase separating LH2 pump system 400 ("system 400") is used for separating hydrogen vapor from LH2 before the LH2 enters the compression chamber portion (e.g., the pump cold end 112) of the example LH2 pump 104. The first example phase separating LH2 pump system 400 includes the onboard LH2 tank 102, the LH2 pump 104, the first LH2 portion 302, the second LH2 portion 304, the first GH2 portion 306, the second GH2 portion 308, the third GH2 portion 310, the suction adapter 110, the pump cold end 112, the motor 114, the discharge flowline 116, the phase separator 312, the filtration structure 314, and the vapor accumulator 316. The example system 400 also includes a first pressure sensor 402, a second pressure sensor 404, and a third pressure sensor 406, a first regulator valve 408, a second regulator valve 410, a GH2 tank 412, a controlling device 414, processor circuitry 416, pressure loop circuitry 418, position loop circuitry 420, storage device(s) 422, and interface circuitry 424.

The example system 400 illustrated in FIG. 4 includes the first, second, and third pressure sensors 402-406 to measure the vapor pressure in different portions of the system 400. In some examples, the first, second, and third pressure sensors 402-406 are cryogenic pressure transducers that can operate in temperatures ranging from 40 K to 70 K and pressures ranging from 0 bar to 415 bar. The example first pressure sensor 402 monitors the vapor pressure in the onboard LH2 tank 102. The example second pressure sensor 404 monitors the vapor pressure in the vapor accumulator 316 and/or the second GH2 portion 308 downstream of the vapor accumulator 316. The example third pressure sensor 406 monitors the vapor pressure in the suction adapter 110 and/or the third GH2 portion 310 downstream of the suction adapter 110.

The example system 400 illustrated in FIG. 4 includes the example first and second regulator valves 408, 410 to permit and/or inhibit flow from the example GH2 tank 412 to the second and/or third GH2 portions 108b, 108c. In some examples, the regulator valves 408, 410 are pressure reducing regulators that reduce an input pressure (e.g., 100 bar) to a lower output pressure (e.g., 20 bar) despite fluctuations in the input pressure (e.g., pressure reductions from 100 bar to 90 bar). In other words, the regulator valves 408, 410 can provide a consistent output pressure at a consistent flowrate.

The example system 400 illustrated in FIG. 4 includes the example GH2 tank 412 to provide GH2 to the second and/or third GH2 portions 108b, 108c. The example controlling device 414 can use hydrogen in the GH2 tank 102 to drive the flow of hydrogen vapor back into the onboard LH2 tank 102. In the illustrated example of FIG. 4, flowlines are connected to both sides of the first and second regulator valves 408, 410. In some examples, the first and second regulator valves 408, 410 are integrated into the GH2 tank 412 and provide male and/or female ports to which flowlines (e.g., vacuum-jacketed flowlines) are connected. The example GH2 tank 412 can store GH2 at cryogenic temperatures (e.g., 20-33K) that are same as or similar to the temperature of the hydrogen vapor or LH2 in the system 400. The GH2 tank 412 can also store GH2 at pressures and densities (e.g., 0.10-1.30 megapascal (MPa) and 1-28 kilograms per cubic meter (kg/m 3)) that do not cause the GH2 to shift into the liquid phase.

The example system 400 illustrated in FIG. 4 includes the controlling device 414 to open and/or close the first and/or second regulator valves 408, 410 and cause the hydrogen vapor to flow from the phase separator 312 and/or the suction adapter 110 to the onboard LH2 tank 102 via the GH2 flowline 108. The controlling device 414 of FIG. 4 may be instantiated (e.g., creating an instance of, bring into being for any length of time, materialize, implement, etc.) by the example processor circuitry 416 such as a central processing unit executing instructions. Additionally or alternatively, the controlling device 414 of FIG. 4 may be instantiated (e.g., creating an instance of, bring into being for any length of time, materialize, implement, etc.) by an application specific integrated circuit (ASIC) or a field programmable gate array (FPGA) structured to perform operations corresponding to the instructions. It should be understood that some or all of the circuitry of the controlling device 414 may, thus, be instantiated at the same or different times. Some or all of the circuitry may be instantiated, for example, in one or more threads executing concurrently on hardware and/or in series on hardware. Moreover, in some examples, some or all of the circuitry of the controlling device 414 may be implemented by microprocessor circuitry executing instructions to implement one or more virtual machines and/or containers.

The example controlling device 414 illustrated in FIG. 4 includes the pressure loop circuitry 418 to determine a target pressure output of the first and second regulator valves 408, 410. In some examples, the pressure loop circuitry 418 is instantiated by processor circuitry executing pressure loop instructions and/or configured to perform operations such as those represented by the flowchart of FIG. 9. The example pressure loop circuitry 418 can detect the vapor pressures in the onboard LH2 tank 102, the second GH2 portion 308, and the third GH2 portion 310 based on measurements obtained by the first, second, and third pressure sensors 402-406. The pressure loop circuitry 418 can determine whether a pressure differential between an upstream and downstream pressure satisfies a threshold. For example, the pressure loop circuitry 418 can determine a first pressure differential between the first and second pressures, a second pressure differential between the first and third pressures, and a third pressure differential between the second and third pressures. The example pressure loop circuitry 418 can also determine whether the first, second, and third pressure differentials satisfy (e.g., are less than, greater than, equal to, etc.) the threshold. As used herein, the first pressure is the vapor pressure in the onboard LH2 tank 102, the second pressure is the vapor pressure within the second GH2 portion 308 and/or the vapor accumulator 316, and the third pressure is the vapor pressure within the third GH2 portion 310 and/or the suction adapter 110.

The threshold may be a predetermined value written into the pressure loop instructions. In some examples, there are multiple thresholds for the different possible pressure differentials to be determined. For example, there can be a first threshold (e.g., 0.1 MPa) for a first pressure differential (e.g., between the first and second pressures), a second threshold (e.g., 0.3 MPa) for a second pressure differential (e.g., between the first and third pressures), and a third threshold (e.g., 0.2 MPa) for a third pressure differential (e.g., between the second and third pressures).

The example controlling device 414 illustrated in FIG. 4 includes the example position loop circuitry 420 to determine target position(s) of stopper(s), plunger(s), diaphragm(s), and/or other electronically actuated mechanical device(s) of the first and second regulator valves 408, 410 to achieve the target output pressure(s). In some examples, the position loop circuitry 420 is instantiated by processor circuitry executing position loop instructions and/or configured to perform operations such as those represented by the flowchart of FIG. 9. In some examples, when the pressure loop circuitry 418 determines that one or more of the pressure differentials do not satisfy the threshold(s), the pressure loop circuitry 418 sends a signal (e.g., including the current pressure and the target output pressure) to the example position loop circuitry 420 to open the first and/or second regulator valves 408, 410. The example position loop circuitry 420 can detect (e.g., via displacement sensor(s) such as a laser sensor, a hall effect sensor, etc.) the current position of the mechanism(s) within the first and/or second regulator valves 408, 410 and determine the target position(s) based on the current output pressure, the target output pressure, and the current position. While the position loop circuitry 420 causes the first and/or second regulator valve(s) 408, 410 to open, the position loop circuitry 420 monitors the position(s) of the mechanical device(s) in the first and/or second regulator valve(s) 408, 410. In some examples, the position loop circuitry 420 causes the mechanical device(s) to actuate until an error between the current position and the target position is substantially zero (e.g., 0.001, 0.005 inches, etc.).

In some examples, the pressure loop circuitry 418 is configured to operate as a closed-loop controller based on the example pressure loop instructions. That is, the example pressure loop circuitry 418 can continually monitor pressure measurements, calculate pressure differentials, and determine whether newly calculated differentials satisfy the threshold(s). In some examples, the pressure loop circuitry 418 continually signals the position loop circuitry 420 to open/close the first and/or second regulator valve(s) 408, 410 until the pressure differential(s) satisfy the threshold(s). For example, the pressure loop circuitry 418 can detect that the first pressure is 1.0 MPa and the second pressure is 0.9 MPa. Given that the threshold is 0.2 MPa, the example pressure loop circuitry 418 can send a signal the position loop circuitry 420 to open the first regulator valve 408 until the second pressure sensor 404 measures a target output pressure of 1.2 MPa (assuming the first pressure remains unchanged).

The example controlling device 414 illustrated in FIG. 4 includes the storage device(s) 422 to accumulate and save data provided to and generated by the controlling device 414. The example storage device(s) 422 can include volatile memory device(s) that store measurement data obtained by the pressure sensor(s) 402-406, target pressure results determined by the pressure loop circuitry 418, target position results determined by the position loop circuitry 420, etc. The example storage device(s) 422 can also include non-volatile memory device(s) and/or mass storage device(s) that store instructions and/or operations to be executed, such as the pressure loop instructions and the position loop instructions mentioned previously. The example controlling device 414 includes the interface circuitry 424 to communicate with the pressure sensors 402-406, the regulator valves 408, 410, the LH2 pump 104, etc. In some examples, the interface circuitry 424 enables the controlling device 414 to receive command inputs from an external source. The interface circuitry 424 is able to receive and/or transmit commands via wired and/or wireless connections.

Figure 5:
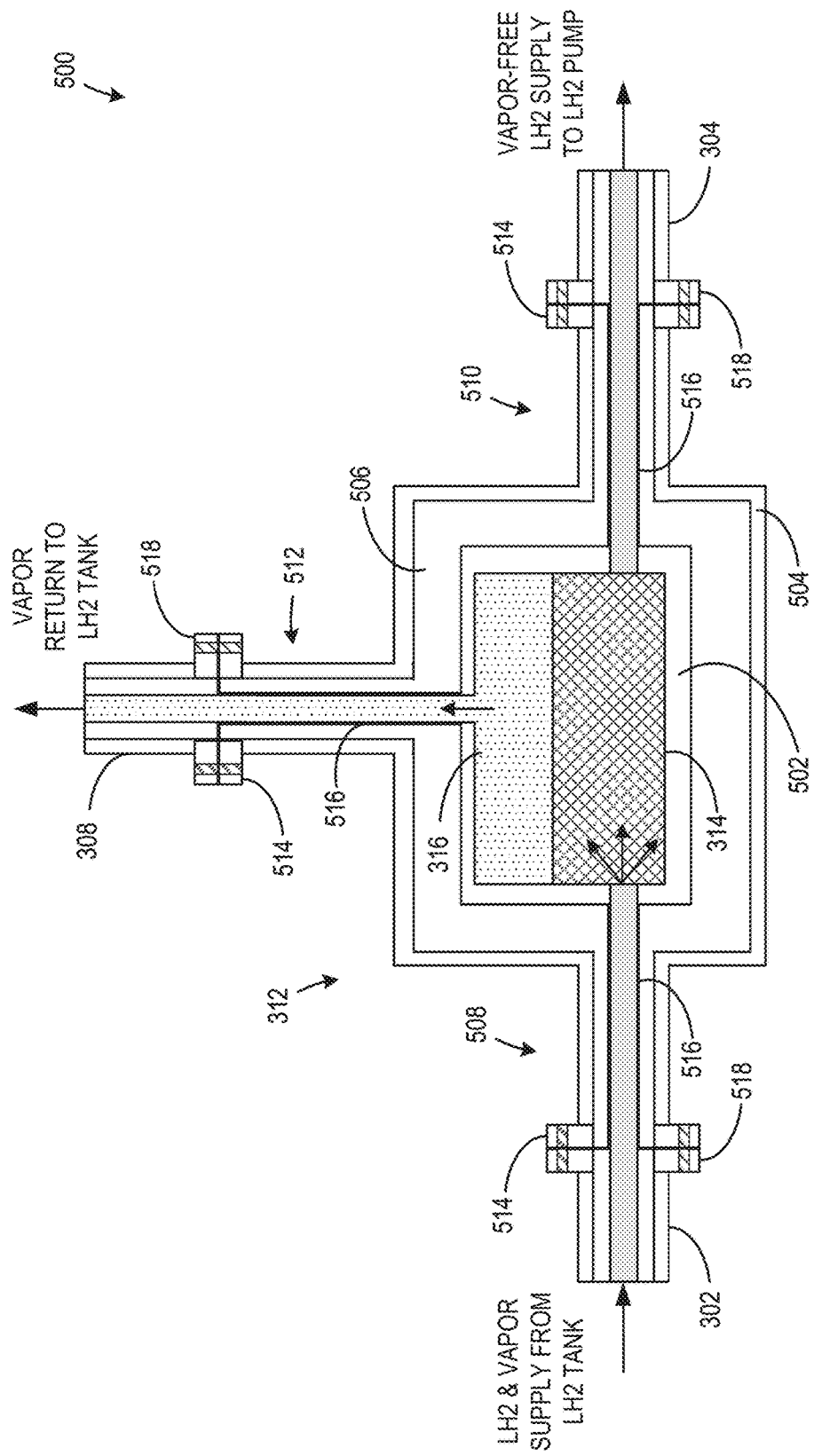
FIG. 5 illustrates an example phase separator assembly integrated into the example first and/or second phase separating LH2 pump systems of FIGS. 3 and/or 4.

FIG. 5 is an illustration of an example phase separator assembly 500 of the phase separator 312 integrated into the first and/or second phase separating LH2 pump systems 300, 400 in accordance with the teachings described herein. The example phase separator assembly 500 illustrated in FIG. 5 includes the first LH2 portion 302, the second LH2 portion 304, the second GH2 portion 308, the phase separator 312, the filtration structure 314, and the vapor accumulator 316 as mentioned previously. The example phase separator assembly 500 also includes an inner vessel 502, an outer vessel 504, a vacuum insulation layer 506, a first port 508, a second port 510, a third port 512, first flanges 514, internal passages 516, and second flanges 518. As shown in FIG. 5, the example phase separator 312 can input the two-phase LH2 and hydrogen vapor (GH2) supply from the onboard LH2 tank 102, output single-phase LH2 to the LH2 pump 104, and output single phase hydrogen vapor back to the onboard LH2 tank 102.

The example phase separator 312 illustrated in FIG. 5 includes the inner vessel 502 to house the filtration structure 314 and the vapor accumulator 316. The example inner vessel 502 can be manufactured from materials with a sufficient HEE index as those mentioned previously in reference to the filtration structure 314. In some examples, the inner vessel 502 or a portion of the inner vessel 502 is additively manufactured in conjunction with the filtration structure 314 such that no binding (e.g., welding, adhesion, coupling, etc.) is needed for the interface between the inner vessel 502 and the filtration structure 314.

The example phase separator 312 illustrated in FIG. 5 includes the outer vessel 504 to frame the inner vessel 502 and the vacuum insulation layer 506. The outer vessel 504 also frames the first, second, and third ports 508-512 to connect the first and second LH2 portions 302, 304 of the LH2 flowline 106 to the filtration structure 314 and to connect the second GH2 portion 308 to the vapor accumulator 316. Since the example outer vessel 504 does not come into direct contact with LH2 or hydrogen vapor, the outer vessel 504 may be fabricated out of metal alloy(s) (e.g., aluminum, steel, etc.) and/or composite materials (e.g., carbon fiber, fiberglass, etc.) that are not tested in a hydrogen embrittlement environment and do not have an associated HEE index. In some examples, the phase separator 312 includes supporting structures such as suspension device(s) to couple the inner and outer vessels 502, 504 statically or dynamically.

The example phase separator 312 illustrated in FIG. 5 includes the vacuum insulation layer 506 to inhibit heat transfer from surrounding atmosphere to the LH2 and/or GH2 in the filtration structure 314, the vapor accumulator 316, and/or the inner flowlines of the first LH2 portion 302, the second LH2 portion 304, and the second GH2 portion 308. The example vacuum insulation layer 506 can include multi-layer insulation (MLI), which is a thermal insulation that includes multiple layers of thin sheets of material(s) (e.g., plastics such as polyethylene terephthalate, polyimide, etc.) coated on one or both sides with a thin layer of metal (e.g., silver, aluminum, gold, etc.). Some types of MLI are used in applications that operate in vacuum conditions (e.g., cryogenic tanks, satellites, orbital telescopes, etc.) because of MLI's effectiveness in impeding radiation heat transfer common in such environments. In some examples, the vacuum insulation layer 506 includes MLI and/or other insulating materials (e.g., foam, ceramic fibers, etc.) used in combination to inhibit the heat transfer into the phase separator 312. As shown in FIG. 5, the vacuum insulation layer 506 occupies the space between the inner and outer vessels 502, 504 as well as within the first, second, and third ports 508-512. In some examples, the vacuum insulation layer 506 is installed in the phase separator 312, the outer vessel 504 is sealed, and a vacuum depressurizes the vacuum insulation layer 506 to near zero pressure (e.g., $1.3*10^{-11}$ Pa).

The example phase separator 312 includes the first, second, and third ports 508-512 to integrate the phase separator 312 into the first and second flowlines 106, 108. As mentioned previously, the first and second flowlines 106, 108 are vacuum jacketed flowlines that can connect to other cryogenic devices (e.g., valves, tanks, other flowlines, etc.) via bayonet connections to provide seamless connection points with sufficient insulation where heat losses likely occur. A bayonet connection includes a male bayonet that fits inside of and is fixed to a female port. In some examples the male bayonets and female ports are machined to a tight tolerance (e.g., 0.001, 0.005 inches, etc.) to provide a slip fit and reduce and/or eliminate intermediary space that may not be depressurized to vacuum conditions. In some examples, the male bayonets and female ports include flanges (e.g., first flanges 514 and second flanges 518) with seals (e.g., O-rings, high vacuum gaskets, etc.) that are bolted together to form an air-tight coupling between the first and second flowlines 106, 108 and the cryogenic device (e.g., the phase separator 312).

As illustrated in FIG. 5, the first, second, and third ports 508-512 are female ports of bayonet connections, and the first and second flowlines 106, 108 include the male bayonets of the bayonet connections. The example inner vessel 502 includes the inner passages 516 through which the inner lines (male bayonets) of the first and second flowlines 106, 108 can fit into and extend to the filtration structure 314 and the vapor accumulator 316 respectively. The example internal passages 516 of the inner vessel 502 protrude outward from the interior of the phase separator 312 and terminate at outer surfaces of the first flanges 514. Likewise, the outer vessel 504 protrudes outward from the phase separator 312 to the first flanges 514 to frame the first, second, and third ports 508-512 and to house the vacuum insulation layer 506 within the first, second, and third ports 508-512. The example first flanges 514 can be fixed to the outer vessel 504 via mechanical couplings such as welding.

As shown in FIG. 5, the example first flanges 514 are coupled to the example second flanges 518 via bolts. In some examples, the first and second flanges 514, 518 are coupled via other mechanisms such as adhesives, clamps, radial pins, and/or other fastening mechanisms. In the illustrated example of FIG. 5, the first flanges 514 are fixed to the outer vessel 504, and the second flanges 518 are fixed to an outer lining of the first and second flowlines 106, 108. This example assembly allows the vacuum insulation layer 506 to be open to and/or be in contact with the vacuum insulation layer of the first and second flowlines 106, 108. Thus, the phase separator 312 can be said to be integrated into the first and second flowlines 106, 108 because the respective vacuum insulation layers can be depressurized to vacuum conditions at a same or similar instance. In some examples, the first and second flanges 514, 518 are not included, and the bayonet connections at the first, second, and/or third ports 508-512 are fastened via springs, pins, "L-shaped" slots, etc.

The example phase separator assembly 500 illustrated in FIG. 5 includes the first LH2 portion 302, the second LH2 portion 304, and the second GH2 portion 308 as the male bayonets and the first, second, and third ports 508-512 as the female ports of the bayonet connections mentioned previously. In some examples, the first, second, and third ports 508-512 are the male bayonets that fit into female ports of the first LH2 portion 302, the second LH2 portion 304, and the second GH2 portion 308. In such examples, the internal passages 516 can include flowlines that are fixed to the filtration structure 314 and the vapor accumulator 316 and insert into the first LH2 portion 302, the second LH2 portion 304, and the second GH2 portion 308.

The phase separator 312 integrated into the first and second phase separating LH2 pump systems 300, 400 as described above with reference to FIGS. 3-5 provide multiple advantages to LH2 pumping systems, LH2 tanks, other onboard power systems, etc. Since the GH2 flowline 108 and/or the second GH2 portion 308 are directly connected to the phase separator 312 and/or the vapor accumulator 316, the hydrogen vapor is able to return to the onboard LH2 tank 102, which increases the ability of the onboard LH2 tank 102 to increase the vapor pressure therein. For example, the onboard LH2 tank 102 can include a means for increasing the vapor pressure (e.g., a thermosiphon loop, a heater, a separate GH2 tank, etc.) to maintain a desired NPSH. However, since a larger quantity of hydrogen vapor can be returned to the onboard LH2 tank 102 due to the phase separator 312, less energy and/or work is required to increase the vapor pressure and maintain the desired NPSH. Furthermore, as the vapor pressure increases in the onboard LH2 tank 102, the boiling point of the LH2 also increases, which can reduce the amount of boil-off therein. Therefore, since the phase separator 312 and/or the vapor accumulator 316 is/are integrated into the GH2 flowline 108 and/or the second GH2 portion 308, the amount of boil-off (or evaporation of LH2 fuel) in the onboard LH2 tank 102 decreases. Additionally or alternatively, since the phase separator 312 causes more vapor to be removed from the LH2 flowline 106 and/or the first LH2 portion 302, the first and/or second phase separating LH2 pump systems 300 and/or 400 can provide hydrogen fuel (e.g., GH2) to other systems (e.g., hydrogen fuel cells, hydrogen powered turbine engines, cooling systems, etc.) onboard a vehicle, such as an aircraft.

Figure 6:
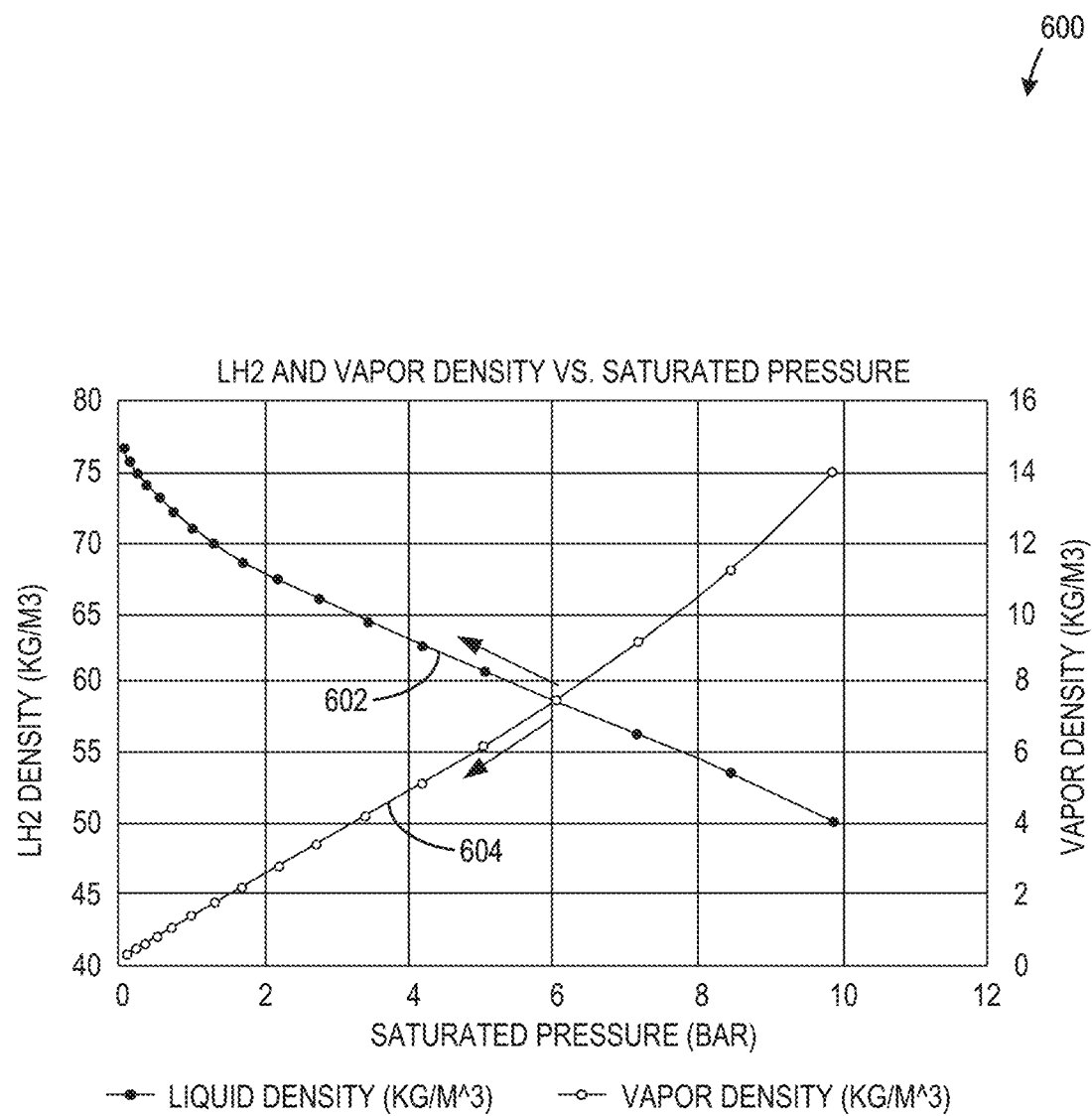
FIG. 6 illustrates an example first chart representing LH2 density and hydrogen vapor density as functions of saturated pressure.

FIG. 6 is an illustration of an example first chart 600 that represents LH2 and GH2 densities as functions of saturated pressure. The example first chart 600 includes a first curve 602 to illustrate LH2 density (kg/m 3) as a function of saturated pressure (bar). The example first chart 600 includes a second curve 604 to illustrate hydrogen vapor density (kg/m 3) as a function of saturated pressure (bar). As mentioned previously, the example phase separator 312 causes the saturated pressure of the two-phase mixture (LH2 and GH2 entering from the first LH2 portion 302 of the LH2 flowline 106) to decrease. The example chart 600 includes arrows along the first and second curves 602, 604 to show how the densities of the LH2 and GH2 within the phase separator 312 change as a result of the changing saturated pressures. That is, as a result of the saturated pressure reduction, the density of the LH2 increases, and the density of the GH2 increases. Thus, as the LH2 continues to flow through the filtration structure 314, the hydrogen vapor rises up to the vapor accumulator 316 and into the GH2 flowline 108 due to the reduced density and buoyancy-driven flow.

Figure 7:
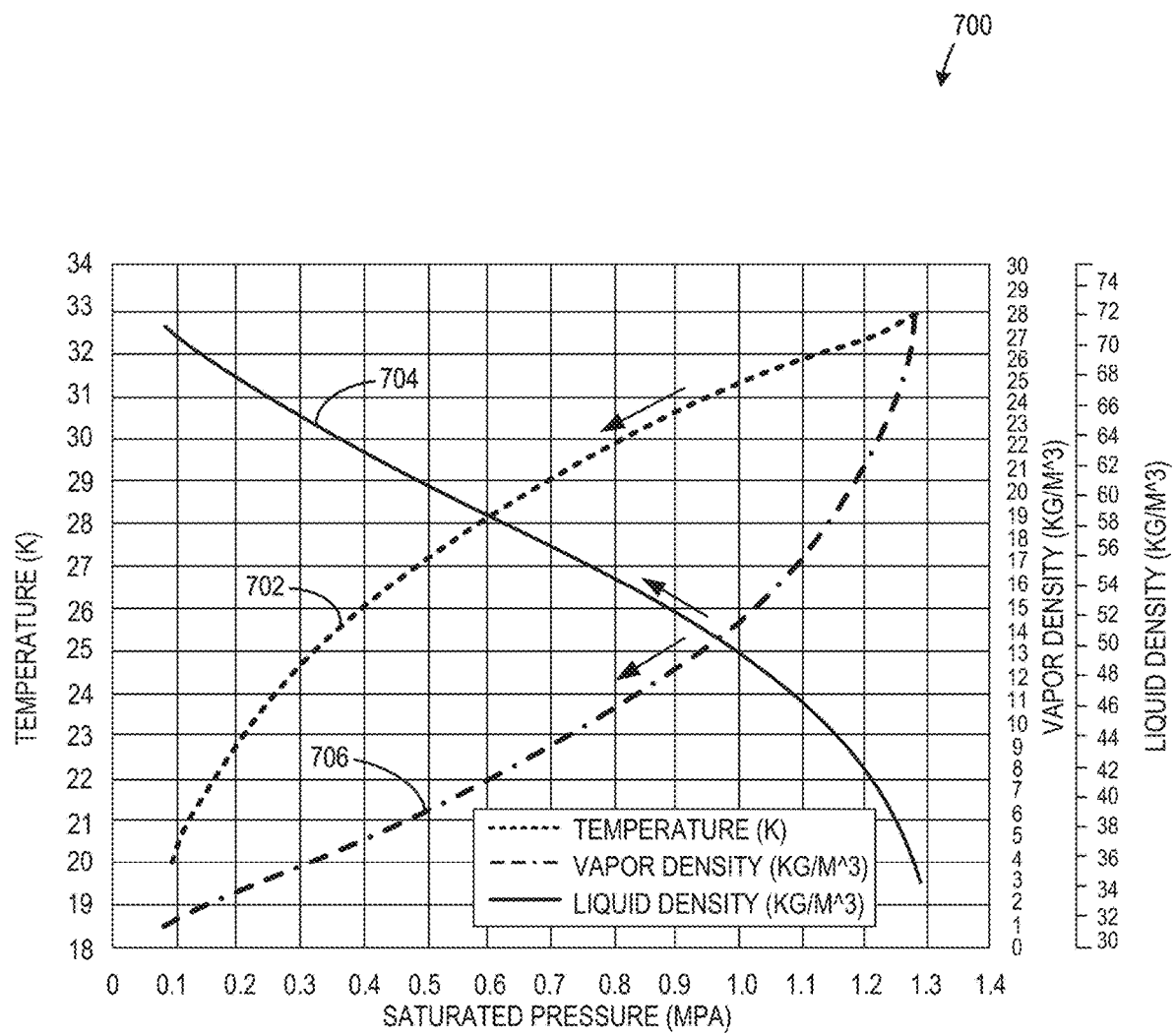
FIG. 7 illustrates an example second chart representing LH2 density, hydrogen vapor density, and temperature as functions of saturated pressure.

FIG. 7 is an illustration of an example second chart 700 that represents temperature of LH2 and/or GH2, density of LH2, and density of hydrogen vapor as functions of saturated pressure. The example second chart 700 includes a first curve 702 to illustrate temperature (K) of LH2 and/or GH2 as a function of saturated pressure (MPa). The example second chart 700 includes a second curve 704 to illustrate LH2 density (kg/m 3) as a function of saturated pressure (MPa). The example second chart 700 includes a third curve 706 to illustrate hydrogen vapor (GH2) density (kg/m 3) as a function of saturated pressure (MPa). Similar to the example first chart 600, the example second chart 700 includes arrows that illustrate how the LH2 density, GH2 density, and temperature change as a result of the phase separator 312 decreasing the saturated pressure.

Figure 8:
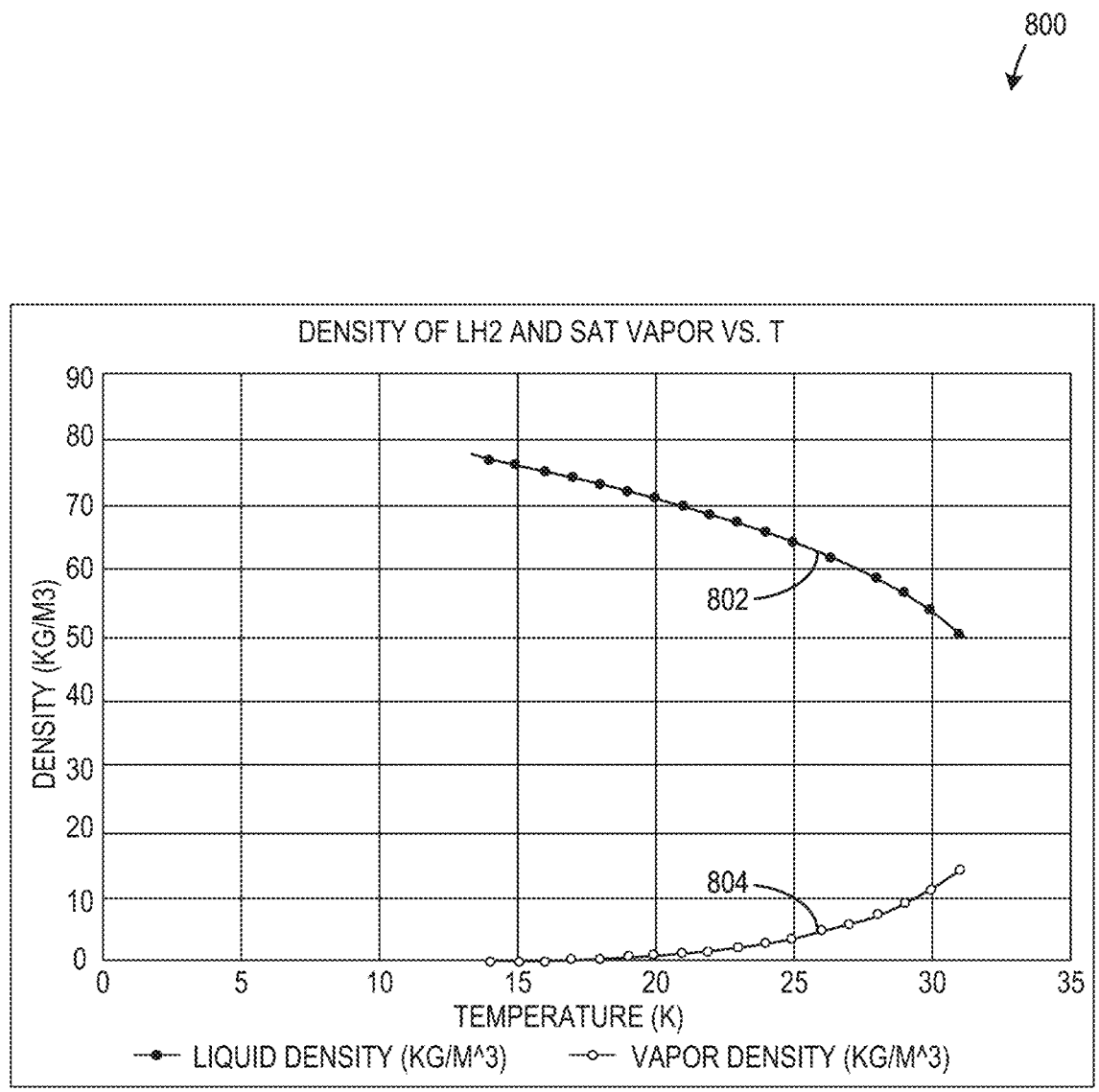
FIG. 8 illustrates an example third chart representing LH2 density and hydrogen vapor density as functions of temperature.

FIG. 8 is an illustration of an example third chart 800 that represents LH2 and GH2 densities as functions of temperature. The example third chart 800 includes a first curve 802 to illustrate LH2 density (kg/m 3) as a function of temperature (K). The example third chart 800 includes a second curve 804 to illustrate hydrogen vapor density (kg/m 3) as a function of temperature (K). The example second and third charts 700, 800 collectively show how the phase separator 312 causes the hydrogen vapor to separate from the LH2 in the filtration structure 314. According to the second chart 700, since the sintered metal of the example filtration structure 314 causes the saturated pressure to decrease, the temperature and the density of the GH2 decreases. According to the third chart 800, the temperature decrease of the GH2 further causes the density of the GH2 to decrease. Thus, the phase separator 312 works two fold, via saturated pressure decreases and temperature decreases, to increase the density of LH2, decrease the density of GH2, and ensure the separation of the two phases.

Figure 9:
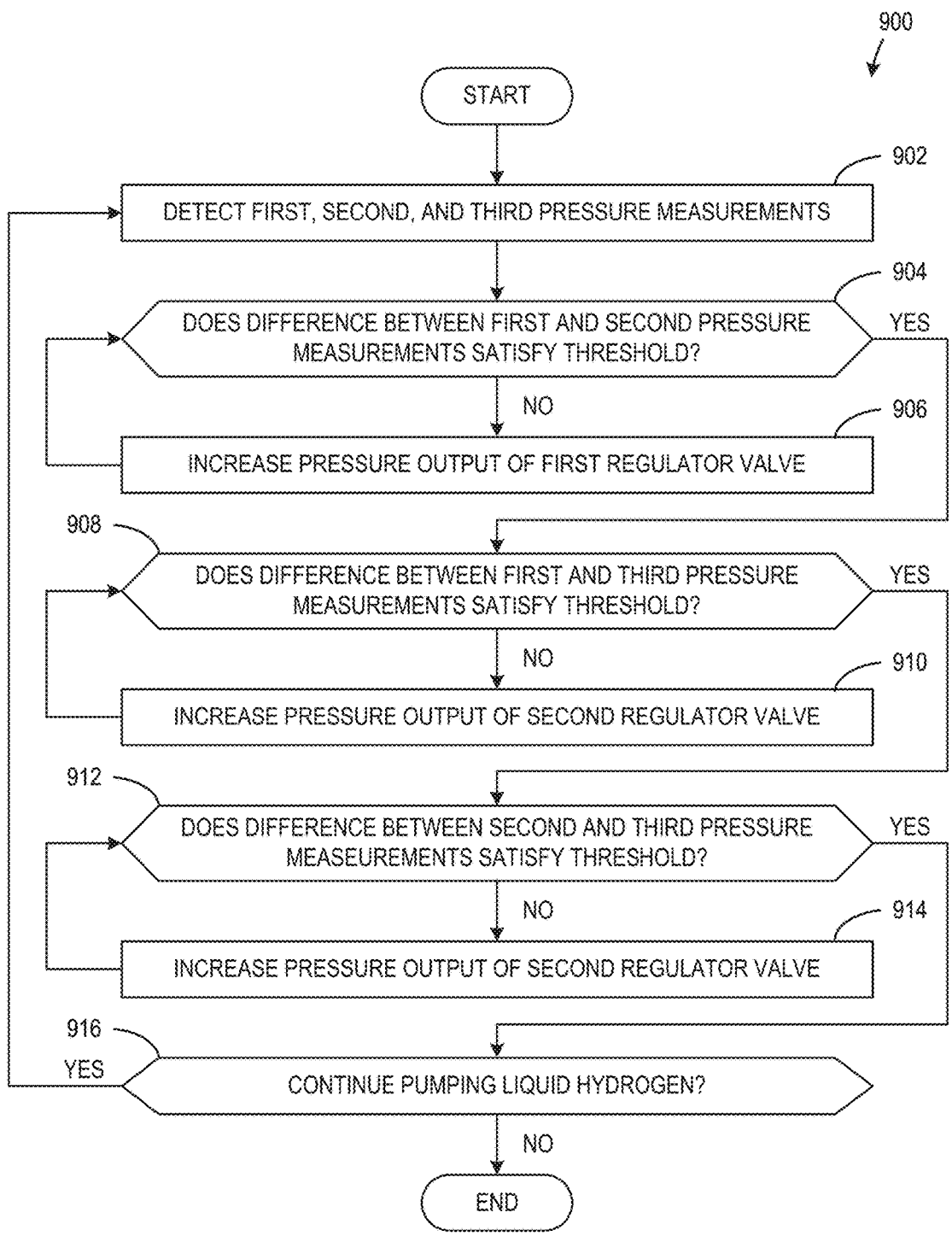
FIG. 9 is a flow diagram illustrating an operation of the second example phase separating LH2 pump system of FIG. 4.

A flowchart representative of example machine readable instructions, which may be executed to configure processor circuitry to implement the controlling device 414 of FIG. 4, is shown in FIG. 9. The machine readable instructions may be one or more executable programs or portion(s) of an executable program for execution by processor circuitry, such as the processor circuitry 1012 shown in the example processor platform 1000 discussed below in connection with FIG. 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 9, many other methods of implementing the example controlling device 414 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or another machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 9 is a flowchart representative of example machine readable instructions and/or example operations 900 that can be executed and/or instantiated by processor circuitry to drive flow of hydrogen vapor from the vapor accumulator 316 and/or the suction adapter 110 to the onboard LH2 tank 102. The machine readable instructions and/or the operations 900 of FIG. 9 begin at block 902, at which the controlling device 414 detects the first, second, and third pressure measurements. For example, the pressure loop circuitry 418 obtains the pressure measurements from the first, second, and third pressure sensors 402-406.

At block 904, the controlling device 414 determines whether the difference between the first and second pressure measurements satisfies a threshold (e.g., a first threshold). For example, the pressure loop circuitry 418 determines whether a first pressure differential satisfies the threshold (e.g., the first threshold). When the pressure loop circuitry 418 determines that the first pressure differential does not satisfy (e.g., is less than) the threshold, then the pressure loop circuitry 418 determines a target output pressure of the first regulator valve 408 that does satisfy the threshold and transmit the second pressure measurement and the target output pressure to the position loop circuitry 420. The operations 900 then proceed to block 906, where the controlling device 414 increases the pressure output of the first regulator valve 408. For example, the position loop circuitry 420 determines a target position based on the current pressure and the target pressure and commands the first regulator valve 408 to open to the target position. The example operations 900 then return to block 904.

When the pressure loop circuitry 418 determines that the first pressure differential does satisfy (e.g., is greater than or equal to) the threshold (e.g., the first threshold), then the example operations 900 proceed to block 908, where the controlling device 414 determines whether the difference between the first and third pressure measurements satisfies the threshold (e.g., a second threshold). For example, the pressure loop circuitry 418 determines whether a second pressure differential satisfies the threshold (e.g., the second threshold). When the pressure loop circuitry 418 determines that the second pressure differential does not satisfy (e.g., is less than) the threshold, then the pressure loop circuitry 418 determines a target output pressure of the second regulator valve 410 that does satisfy the threshold and transmit the third pressure measurement and the target output pressure to the position loop circuitry 420. The operations 900 then proceed to block 910, where the controlling device 414 increases the pressure output of the second regulator valve 410. For example, the position loop circuitry 420 determines a target position based on the third pressure measurement and the target pressure and commands the second regulator valve 410 to open to the target position. The example operations 900 then return to block 908.

When the pressure loop circuitry 418 determines that the second pressure differential does satisfy (e.g., is greater than or equal to) the threshold (e.g., the second threshold), then the example operations 900 proceed to block 912, where the controlling device 414 determines whether the difference between the second and third pressure measurements satisfies the threshold (e.g., a third threshold). For example, the pressure loop circuitry 418 determines whether a third pressure differential satisfies the threshold (e.g., the third threshold). When the pressure loop circuitry 418 determines that the third pressure differential does not satisfy (e.g., is less than) the threshold, then the pressure loop circuitry 418 determines a target output pressure of the second regulator valve 410 that does satisfy the threshold and transmit the third pressure measurement and the target output pressure to the position loop circuitry 420. The operations 900 then proceed to block 914, where the controlling device 414 increases the pressure output of the second regulator valve 410. For example, the position loop circuitry 420 determines a target position based on the third pressure measurement and the target pressure and commands the second regulator valve 410 to open to the target position. The example operations 900 then return to block 912.

When the pressure loop circuitry 418 determines that the third pressure differential does satisfy (e.g., is greater than or equal to) the threshold (e.g., the third threshold), then the example operations 900 proceed to block 916, where the controlling device 414 determines whether the second phase separating LH2 pump system 400 is to continue pumping. For example, the position loop circuitry 420 determines whether a signal to cease operation of the system 400 has been input to the controlling device 414. The example input may be from a user of the system 400, a sensor in the onboard LH2 tank 102 indicating the LH2 fuel level is substantially low, an automatic shut-off signal due to a failure in the LH2 pump 104, etc. When the example position loop circuitry 420 determines that the system 400 is to continue pumping LH2, then the operations 900 return to block 902. When the example position loop circuitry 420 determines that the system 400 is not to continue pump LH2, then the operations 900 end.

Figure 10:
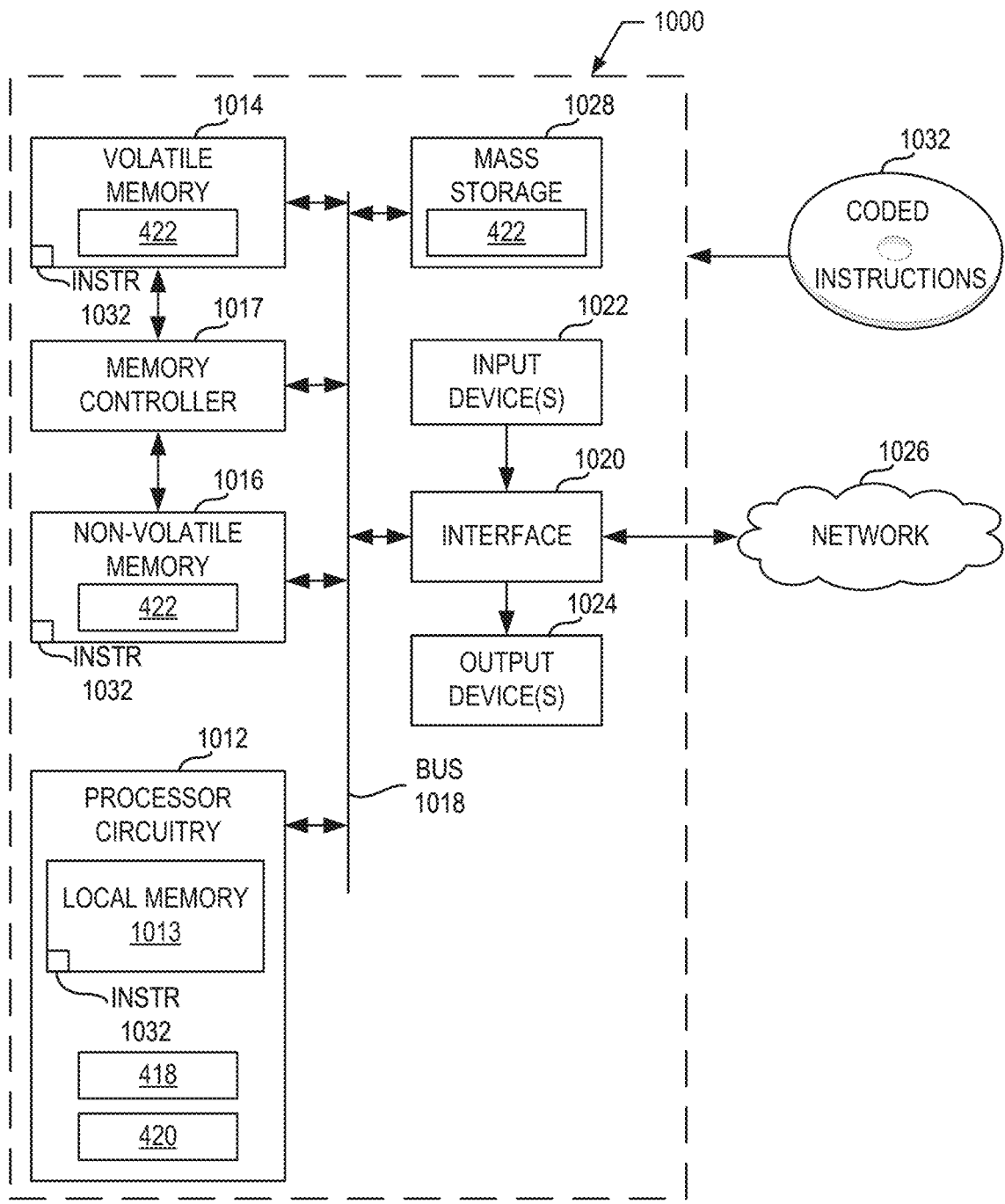
FIG. 10 illustrates an example processing platform including processor circuitry structured to execute the example machine readable instructions of FIG. 9.

FIG. 10 is a block diagram of an example processor platform 1000 structured to execute and/or instantiate the machine readable instructions and/or the operations of FIG. 9 to implement the controlling device 414 of FIG. 4. The processor platform 1000 can be, for example, a controller, an embedded controller, an integrated and/or embedded chip, or any other type of computing and/or controlling device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example pressure loop circuitry 418 and the example position loop circuitry 420.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, a touchscreen, a trackpad, a control panel, a switch board, etc.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIG. 9, may be stored in the mass storage device 1028, in the volatile memory 1014, in the non-volatile memory 1016, and/or on a removable non-transitory computer readable storage medium such as a CD or DVD.

From the foregoing, it will be appreciated that disclosed example systems, methods, apparatus, and articles of manufacture have been disclosed that separate the hydrogen vapor phase from cryogenic liquid hydrogen fuel prior to entering an LH2 pump. Example phase separating LH2 pumping systems disclosed herein improve the efficiency and lifespan of an LH2 pump by integrating a phase separator into LH2 and GH2 vacuum-jacketed flowlines leading into and out of the LH2 pump. The phase separator removes hydrogen vapor bubbles (e.g., cavities) present in LH2 extracted from onboard LH2 tanks such that cavitation damage does not occur in the LH2 pump, which allows the LH2 pump to provide a consistent flow of compressed LH2 to power systems (e.g., hydrogen powered turbine engines, etc.) and increases the functional longevity of the LH2 pump (e.g., the time between repairs, maintenance, etc.). Furthermore, example phase separating LH2 pumping systems disclosed herein increase the amount of hydrogen vapor returned to the LH2 supply tank, which increases the vapor pressure in the LH2 tank. Since vapor pressures are increased by the example systems disclosed herein, the LH2 supply tank can rely less on a mechanical device and/or system (e.g., a thermosiphon loop) to increase the vapor pressure, which conserves energy. Furthermore, increased vapor pressure in the LH2 tank reduces the amount of boil-off in the tank (due to the relationship between vapor pressure and boiling point), which reduces LH2 fuel loss due to evaporation. Example phase separating LH2 pumping systems disclosed herein can also increase the amount of hydrogen fuel (e.g., GH2) that is distributed to other onboard systems (e.g., power systems) from the GH2 return flowline(s) and/or the phase separator.

Further aspects of the present disclosure are provided by the subject matter of the following clauses:

Example methods, apparatus, systems, and articles of manufacture to separate phases in cryogenic pumps are disclosed herein. Further examples and combinations thereof include the following:

Example 1 includes a cryogenic pump system comprising a cryogenic liquid tank, a cryogenic pump including a suction adapter, the suction adapter connected to the cryogenic liquid tank via a liquid supply line and a gaseous return line, and a phase separator connected downstream of the cryogenic liquid tank and upstream of the cryogenic pump, the phase separator including a filtration structure integrated into the liquid supply line to separate vapor from cryogenic liquid, the phase separator connected to the gaseous return line to direct the vapor to the cryogenic liquid tank.

Example 2 includes the cryogenic pump system of any preceding clause, wherein the filtration structure includes a sintered metal fabricated using an additive manufacturing process.

Example 3 includes the cryogenic pump system of any preceding clause, wherein the sintered metal includes at least one of titanium, an aluminum-based alloy, or an austenitic steel alloy.

Example 4 includes the cryogenic pump system of any preceding clause, wherein the liquid supply line and the gaseous return line are vacuum jacketed flowlines.

Example 5 includes the cryogenic liquid pump system of any preceding clause, wherein the liquid supply line and the gaseous return line are connected to the phase separator via bayonet connections.

Example 6 includes the cryogenic pump system of any preceding clause, wherein the phase separator includes a vacuum insulation layer positioned between an inner vessel and an outer vessel.

Example 7 includes the cryogenic pump system of any preceding clause, wherein the gaseous return line includes a first portion connected to the cryogenic liquid tank, a second portion connected to the phase separator and the first portion, and a third portion connected to the suction adapter and the first portion.

Example 8 includes the cryogenic pump system of any preceding clause, further including a gaseous tank connected to the second portion via a first regulator valve and connected to the third portion via a second regulator valve, and a first pressure sensor in the cryogenic liquid tank, a second pressure sensor in the second portion, and a third pressure sensor in the third portion.

Example 9 includes the cryogenic pump system of any preceding clause, further including a controlling device to obtain a first pressure measurement from the first pressure sensor, a second pressure measurement from the second pressure sensor, and a third pressure measurement from the third pressure sensor, determine whether a first pressure differential between the first and second pressure measurements satisfies a threshold, determine whether a second pressure differential between the first and third pressure measurements satisfies the threshold, determine whether a third pressure differential between the second and third pressure measurements satisfies the threshold, and in response to determining that the first, second, or third pressure differential does not satisfy the threshold, adjust one or more pressure outputs of the first or second regulator valves.

Example 10 includes an apparatus for separating gaseous hydrogen (GH2) from liquid hydrogen (LH2) in an LH2 pump, the apparatus comprising a phase separator integrated into an LH2 flowline and a GH2 flowline, the phase separator including a filtration structure and a vapor accumulator, the GH2 flowline including a first GH2 portion upstream from an LH2 storage tank, a second GH2 portion downstream of the vapor accumulator, and a third GH2 portion downstream of the LH2 pump, the LH2 storage tank including a first pressure sensor, the second GH2 portion including a second pressure sensor, and the third GH2 portion including a third pressure sensor, a GH2 storage tank connected to the second GH2 portion via a first regulator valve and the third GH2 portion via a second regulator valve, and a controlling device configured to determine pressure differentials between pressure measurements of at least two of the first, second, and third pressure sensors, determine whether the pressure differentials satisfy a threshold, and when at least one of the pressure differentials does not satisfy the threshold, increase a pressure output of at least one of the first or second regulator valves.

Example 11 includes the apparatus of any preceding clause, wherein the filtration structure includes a sintered metal fabricated using an additive manufacturing process.

Example 12 includes the apparatus of any preceding clause, wherein the sintered metal includes at least one of titanium, an aluminum-based alloy, or an austenitic steel alloy.

Example 13 includes the apparatus of any preceding clause, wherein the LH2 and GH2 flowlines are vacuum-jacketed flowlines.

Example 14 includes the apparatus of any preceding clause, wherein the phase separator includes an inner vessel, an outer vessel, and a vacuum insulation layer.

Example 15 includes the apparatus of any preceding clause, wherein the vacuum insulation layer of the phase separator is open to vacuum insulation layers of the LH2 and GH2 flowlines.

Example 16 includes the apparatus of any preceding clause, wherein the LH2 pump includes a suction adapter, a pump cold end, a motor, and a discharge flowline to output compressed LH2 from the pump cold end.

Example 17 includes a method comprising detecting first, second, and third pressure measurements, the first pressure measurement corresponding to a vapor pressure in a liquid hydrogen (LH2) storage tank, the second pressure measurement corresponding to a vapor pressure in a first portion of a gaseous hydrogen (GH2) flowline, the third pressure measurement corresponding to a vapor pressure in a second portion of the GH2 flowline, and adjusting at least one of a pressure output of a first regulator valve or a pressure output of a second regulator valve to drive GH2 from a phase separator to the LH2 storage tank.

Example 18 includes the method of any preceding clause, further including calculating a first pressure differential between the first and second pressure measurements, calculating a second pressure differential between the first and third pressure measurements, and calculating a third pressure differential between the second and third pressure measurements.

Example 19 includes the method of any preceding clause, further including determining whether the first, second, or third pressure differentials satisfy a threshold.

Example 20 includes the method of any preceding clause, wherein adjusting the pressure output of the first regulator valve and the pressure output of the second regulator valve includes increasing the pressure output of the first regulator valve in response to the first pressure differential not satisfying the threshold, and increasing the pressure output of the second regulator valve in response to the second or third pressure differentials not satisfying the threshold.

Example 21 includes a non-transitory machine readable storage medium comprising instructions that, when executed, cause processor circuitry to at least obtain first, second, and third pressure measurements, the first pressure measurement corresponding to a vapor pressure in a liquid hydrogen (LH2) storage tank, the second pressure measurement corresponding to a vapor pressure in a first portion of a gaseous hydrogen (GH2) flowline, the third pressure measurement corresponding to a vapor pressure in a second portion of the GH2 flowline, and change at least one of a pressure output of a first regulator valve or a pressure output of a second regulator valve to drive GH2 from a phase separator to the LH2 storage tank.

Example 22 includes the non-transitory machine readable storage medium of any preceding clause, wherein the instructions cause the processor circuitry to compute a first pressure differential between the first and second pressure measurements, compute a second pressure differential between the first and third pressure measurements, and compute a third pressure differential between the second and third pressure measurements.

Example 23 includes the non-transitory machine readable storage medium of any preceding clause, wherein the instructions cause the processor circuitry to determine whether the first, second, or third pressure differentials satisfy a threshold.

Example 24 includes the non-transitory machine readable storage medium of any preceding clause, wherein the instructions cause the processor circuitry to increase the pressure output of the first regulator valve in response to the first pressure differential not satisfying the threshold, and increase the pressure output of the second regulator valve in response to the second or third pressure differentials not satisfying the threshold.

Example 25 includes an aircraft liquid hydrogen (LH2) pump system comprising an onboard LH2 tank, an LH2 pump including a suction adapter, the suction adapter connected to the onboard LH2 tank via an LH2 supply line and a gaseous hydrogen (GH2) return line, and a phase separator connected downstream of the onboard LH2 tank and upstream of the LH2 pump, the phase separator including a filtration structure integrated into the LH2 supply line to separate GH2 from LH2, the phase separator connected to the GH2 return line to direct the GH2 to the onboard LH2 tank.

Example 26 includes the aircraft LH2 pump system of any preceding clause, wherein the filtration structure includes a sintered metal fabricated using an additive manufacturing process.

Example 27 includes the aircraft LH2 pump system of any preceding clause, wherein the sintered metal includes at least one of titanium, an aluminum-based alloy, or an austenitic steel alloy.

Example 28 includes the aircraft LH2 pump system of any preceding clause, wherein the LH2 supply line and the GH2 return line are vacuum jacketed flowlines.

Example 29 includes the aircraft LH2 pump system of any preceding clause, wherein the LH2 supply line and the GH2 return line are connected to the phase separator via bayonet connections.

Example 30 includes the aircraft LH2 pump system of any preceding clause, wherein the phase separator includes a vacuum insulation layer positioned between an inner vessel and an outer vessel.

Example 31 includes the aircraft LH2 pump system of any preceding clause, wherein the GH2 return line includes a first portion connected to the onboard LH2 tank, a second portion connected to the phase separator and the first portion, and a third portion connected to the suction adapter and the first portion.

Example 32 includes the aircraft LH2 pump system of any preceding clause, further including a GH2 tank connected to the second portion via a first regulator valve and connected to the third portion via a second regulator valve, and a first pressure sensor in the onboard LH2 tank, a second pressure sensor in the second portion, and a third pressure sensor in the third portion.

Example 33 includes the aircraft LH2 pump system of any preceding clause, further including a controlling device to obtain a first pressure measurement from the first pressure sensor, a second pressure measurement from the second pressure sensor, and a third pressure measurement from the third pressure sensor, determine whether a first pressure differential between the first and second pressure measurements satisfies a threshold, determine whether a second pressure differential between the first and third pressure measurements satisfies the threshold, determine whether a third pressure differential between the second and third pressure measurements satisfies the threshold, and in response to determining that the first, second, or third pressure differential does not satisfy the threshold, adjust one or more pressure outputs of the first or second regulator valves.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:
1. A cryogenic pump system comprising:
a cryogenic liquid tank;
a cryogenic pump including a suction adapter, the suction adapter connected to the cryogenic liquid tank via a liquid supply line and a gaseous return line;
a phase separator connected downstream of the cryogenic liquid tank and upstream of the cryogenic pump, the phase separator including a filtration structure integrated into the liquid supply line to separate vapor from cryogenic liquid, the phase separator connected to the gaseous return line to direct the vapor to the cryogenic liquid tank, the gaseous return line including a first portion connected to the cryogenic liquid tank, a second portion connected to the phase separator and the first portion, and a third portion connected to the suction adapter and the first portion;
a gaseous tank connected to the second portion via a first regulator valve and connected to the third portion via a second regulator valve; and
a first pressure sensor in the cryogenic liquid tank, a second pressure sensor in the second portion, and a third pressure sensor in the third portion.

2. The cryogenic pump system of claim 1, wherein the filtration structure includes a sintered metal fabricated using an additive manufacturing process.

3. The cryogenic pump system of claim 2, wherein the sintered metal includes at least one of titanium, an aluminum-based alloy, or an austenitic steel alloy.

4. The cryogenic pump system of claim 1, wherein the liquid supply line and the gaseous return line are vacuum-jacketed flowlines.

5. The cryogenic pump system of claim 1, wherein the liquid supply line and the gaseous return line are connected to the phase separator via bayonet connections.

6. The cryogenic pump system of claim 1, wherein the phase separator includes a vacuum insulation layer positioned between an inner vessel and an outer vessel.

7. The cryogenic pump system of claim 1, further including a controlling device to:

obtain a first pressure measurement from the first pressure sensor, a second pressure measurement from the second pressure sensor, and a third pressure measurement from the third pressure sensor;

determine whether a first pressure differential between the first and second pressure measurements satisfies a threshold;

determine whether a second pressure differential between the first and third pressure measurements satisfies the threshold;

determine whether a third pressure differential between the second and third pressure measurements satisfies the threshold; and in response to determining that the first, second, or third pressure differential does not satisfy the threshold, adjust one or more pressure outputs of the first or second regulator valves.

8. A vehicle including:
a gas turbine engine;
a cryogenic liquid tank to fluidly coupled to the gas turbine engine;
a cryogenic pump including a suction adapter, the suction adapter connected to the cryogenic liquid tank via a liquid supply line and a gaseous return line;
a phase separator connected downstream of the cryogenic liquid tank and upstream of the cryogenic pump, the phase separator including a filtration structure integrated into the liquid supply line to separate vapor from cryogenic liquid, the phase separator connected to the gaseous return line to direct the vapor to the cryogenic liquid tank, the gaseous return line including a first portion connected to the cryogenic liquid tank, a second portion connected to the phase separator and the first portion, and a third portion connected to the suction adapter and the first portion;
a gaseous tank connected to the second portion via a first regulator valve and connected to the third portion via a second regulator valve; and
a first pressure sensor in the cryogenic liquid tank, a second pressure sensor in the second portion, and a third pressure sensor in the third portion.

9. The vehicle of claim 8, wherein the filtration structure includes a sintered metal fabricated using an additive manufacturing process.

10. The vehicle of claim 9, wherein the sintered metal includes at least one of titanium, an aluminum-based alloy, or an austenitic steel alloy.

11. The vehicle of claim 8, wherein the liquid supply line and the gaseous return line are vacuum-jacketed flowlines.

12. The vehicle of claim 8, wherein the liquid supply line and the gaseous return line are connected to the phase separator via bayonet connections.

13. The vehicle of claim 8, wherein the phase separator includes a vacuum insulation layer positioned between an inner vessel and an outer vessel.

14. The vehicle of claim 8, further including a controlling device to:
obtain a first pressure measurement from the first pressure sensor, a second pressure measurement from the second pressure sensor, and a third pressure measurement from the third pressure sensor;
determine whether a first pressure differential between the first and second pressure measurements satisfies a threshold;
determine whether a second pressure differential between the first and third pressure measurements satisfies the threshold;
determine whether a third pressure differential between the second and third pressure measurements satisfies the threshold; and
in response to determining that the first, second, or third pressure differential does not satisfy the threshold, adjust one or more pressure outputs of the first or second regulator valves.

15. The vehicle of claim 8, wherein the vehicle is an aircraft.

16. The vehicle of claim 8, further including a discharge flowline downstream of the suction adapter, the discharge flowline to direct the cryogenic liquid to the gas turbine engine.

* * * * *